(12) United States Patent
Fukushima

(10) Patent No.: US 12,142,782 B2
(45) Date of Patent: Nov. 12, 2024

(54) ELECTROCHEMICAL CELL

(71) Applicant: KYOCERA CORPORATION, Kyoto (JP)

(72) Inventor: Takaaki Fukushima, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 726 days.

(21) Appl. No.: 17/296,550

(22) PCT Filed: Nov. 22, 2019

(86) PCT No.: PCT/JP2019/045788
§ 371 (c)(1),
(2) Date: May 25, 2021

(87) PCT Pub. No.: WO2020/110937
PCT Pub. Date: Jun. 4, 2020

(65) Prior Publication Data
US 2022/0029239 A1    Jan. 27, 2022

(30) Foreign Application Priority Data
Nov. 26, 2018  (JP) .................................. 2018-220320

(51) Int. Cl.
*H01M 50/291* (2021.01)
*H01M 50/10* (2021.01)
(Continued)

(52) U.S. Cl.
CPC ......... *H01M 50/291* (2021.01); *H01M 50/10* (2021.01); *H01M 50/105* (2021.01); *H01M 50/209* (2021.01); *H01M 50/211* (2021.01); *H01M 50/224* (2021.01); *H01M 50/227* (2021.01); *H01M 50/229* (2021.01);
(Continued)

(58) Field of Classification Search
CPC ............ H01M 50/291; H01M 50/209; H01M 50/105; H01M 50/211
See application file for complete search history.

(56) References Cited

U.S. PATENT DOCUMENTS 10,840,563 B2 * 11/2020 Sasakawa ............. H01M 50/55
2006/0178051 A1    8/2006 Hashida et al.
2018/0212207 A1 *  7/2018 Mino .................. H01M 10/647

FOREIGN PATENT DOCUMENTS

CN    106410101 A  *  2/2017  .......... B60L 11/1864
JP    2005129267 A       5/2005
(Continued)

*Primary Examiner* — Jonathan G Jelsma
(74) *Attorney, Agent, or Firm* — HAUPTMAN HAM, LLP

(57) ABSTRACT

An electrochemical cell includes a first unit cell including a first power generation element and a first inner container which accommodates the first power generation element; a second unit cell including a second power generation element and a second inner container which accommodates the second power generation element; an outer container which accommodates the first unit cell and the second unit cell. A surface of the first inner container is provided with a convexity that has a curved surface and/or a flat surface, and a surface of the second inner container is provided with a concavity that has a curved surface and/or a flat surface. The electrochemical cell includes a fit portion in which the convexity is fitted in the concavity.

15 Claims, 16 Drawing Sheets

(51) Int. Cl.
  *H01M 50/105*   (2021.01)
  *H01M 50/209*   (2021.01)
  *H01M 50/211*   (2021.01)
  *H01M 50/224*   (2021.01)
  *H01M 50/227*   (2021.01)
  *H01M 50/229*   (2021.01)
  *H01M 50/231*   (2021.01)
  *H01M 50/236*   (2021.01)
  *H01M 50/24*    (2021.01)

(52) U.S. Cl.
  CPC ........ *H01M 50/231* (2021.01); *H01M 50/236* (2021.01); *H01M 50/24* (2021.01)

(56) References Cited

FOREIGN PATENT DOCUMENTS

| | | | | |
|---|---|---|---|---|
| JP | 2006228706 A | 8/2006 | | |
| JP | 201348042 A | 3/2013 | | |
| JP | 201569959 A | 4/2015 | | |
| JP | 201784463 A | 5/2017 | | |
| WO | WO-2011078220 A1 * | 6/2011 | .......... | H01M 2/1061 |
| WO | WO-2017221536 A1 * | 12/2017 | .............. | H01M 2/02 |

* cited by examiner

ELECTROCHEMICAL CELL

CROSS-REFERENCE TO RELATED APPLICATION

This application is a national stage entry according to 35 U.S.C. 371 of International Application No. PCT/JP2019/045788 filed on Nov. 22, 2019, which claims priority to Japanese Patent Application No. 2018-220320 filed on Nov. 26, 2018, the contents of which are entirely incorporated herein by reference.

TECHNICAL FIELD

The present disclosure relates to an electrochemical cell.

BACKGROUND

An example of heretofore proposed electrochemical cells is shown in Japanese Unexamined Patent Publication JP-A 2013-48042 (Patent Literature 1). The electrochemical cell described in Japanese Unexamined Patent Publication JP-A 2013-48042 (Patent Literature 1) includes a thin cell including an electrode group in sheet form, a non-aqueous electrolyte, and a first outer housing which hermetically stores the electrode group and the non-aqueous electrolyte; and a second outer housing which hermetically stores the thin cell.

SUMMARY

An electrochemical cell according to the disclosure includes a first cell; a second cell; and an outer container which accommodates the first cell and the second cell. The first cell includes a first power generation element; and a first inner container which accommodates the first power generation element. The second cell includes a second power generation element; and a second inner container which accommodates the second power generation element. The outer container accommodates therein the first cell and the second cell. The first cell and the second cell are stacked together. A surface of the first inner container is provided with a convexity that has a curved surface and/or a flat surface, and a surface of the second inner container is provided with a concavity that has a curved surface and/or a flat surface. The electrochemical cell includes a fit portion in which the convexity is fitted in the concavity.

DETAILED DESCRIPTION

Figure 1:
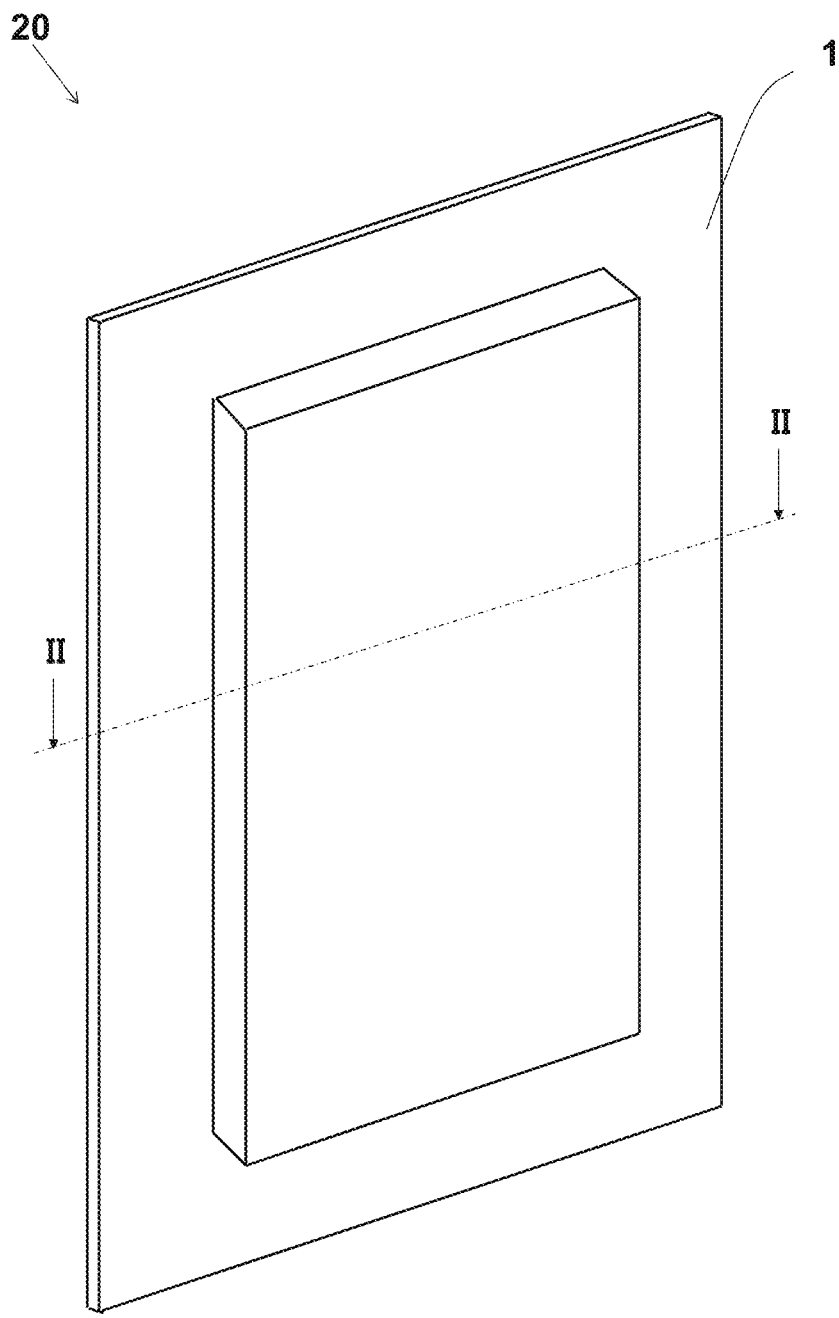
FIG. 1 is a perspective view of an embodiment of an electrochemical cell 20 according to the disclosure.
Figure 2:
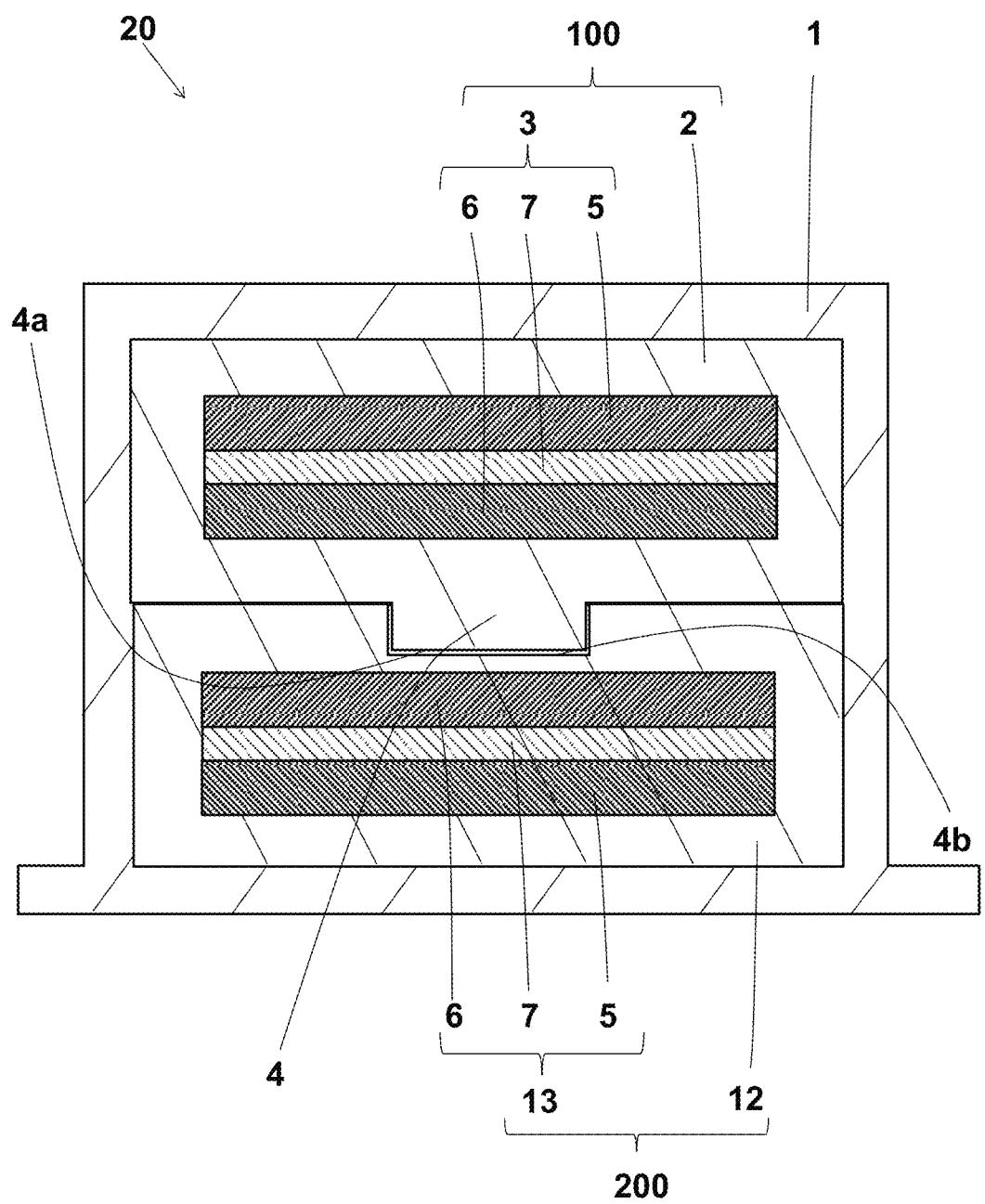
FIG. 2 is a sectional view of the electrochemical cell 20 taken along the line II-II shown in FIG. 1.

Referring to FIGS. 1 and 2, an embodiment of an electrochemical cell 20 according to the disclosure will be described in detail. As shown in FIGS. 1 and 2, the electrochemical cell 20 includes a first unit cell 100; a second unit cell 200; and an outer container 1 which accommodates the first unit cell 100 and the second unit cell 200. Moreover, the first unit cell 100 and the second unit cell 200 are fixed by a fit portion 4.

The first unit cell 100 is a minimum unit of a member which functions as a cell within the electrochemical cell 20. For example, the first unit cell 100 is built as a lithium ion cell. The first unit cell 100 includes a first power generation element 3; a first inner container 2; and a first terminal 8. For example, the first unit cell 100 is shaped in a plate. The first unit cell 100 sends electricity to an external apparatus through its electrical connection with the external apparatus.

The first power generation element 3 is a member that accumulates electricity by exploiting an electrochemical reaction, and discharges the electricity. For example, the first power generation element 3 includes a positive electrode 5; a negative electrode 6; and a separator 7 interposed between the positive electrode 5 and the negative electrode 6. The first power generation element 3 carries out an exchange of a cation and an anion between the positive electrode 5 and the negative electrode 6 through the separator 7. The first power generation element 3 sends electricity to an external apparatus through an electrical connection between the external apparatus and each of the positive electrode 5 and the negative electrode 6.

For example, the first power generation element 3 is constructed of a stack of the positive electrode 5, the separator 7, and the negative electrode 6. For example, the first power generation element 3 is shaped in a plate. In the first power generation element 3, for example, the positive electrode 5, the separator 7, and the negative electrode 6 are successively arranged in order in the direction of the thickness of the plate.

For example, the positive electrode 5 and the negative electrode 6 are each a member containing an electrochemically active substance. For example, the positive electrode 5 and the negative electrode 6 may contain an active substance and an electrolytic substance. For example, a solvent or solvent mixture with salt added may be used as the electrolytic substance.

Specific examples of the active substance and the electrolytic substance used for the positive electrode 5 and the negative electrode 6 include those as described in U.S. Provisional Patent Application No. 61/787,382 entitled "Semi-Solid Electrodes Having High Rate Capability" and U.S. Provisional Patent Application No. 61/787,372 entitled "Asymmetric Battery Having a Semi-Solid Cathode and High Energy Density Anode". The positive electrode 5 and the negative electrode 6 may contain an additive, for example.

The separator 7 is a member intended for an exchange of a cation and an anion between the positive electrode 5 and the negative electrode 6. For example, the separator 7 may be provided with fine pores for the passage of cations and anions therethrough. For example, the separator 7 may be made of a porous insulating material. Specific examples of the material of construction of the separator 7 include polyolefin and polyvinyl chloride. In the first power generation g element 3, the placement of the separator 7 permits electrical isolation between the positive electrode 5 and the negative electrode 6.

In the case where the first power generation element 3 is shaped in a plate, for example, the first power generation element 3 can be set to a longitudinal length of 50 to 500 mm, a transverse length of 50 to 300 mm, and a thickness of 0.1 to 2 mm.

The first inner container 2 is a member including a space therein for encasing the first power generation element 3. The first inner container 2 can protect the first power generation element 3 from external environment. More specifically, the first inner container 2 is configured to electrically insulate the first power generation element 3 from the exterior thereof. Moreover, the first inner container 2 can prevent ingress of dust such as metal chippings.

The first inner container 2 covers the whole of the first power generation element 3. For example, the first inner container 2 is shaped in a flat bag. For example, the first inner container 2 is formed by shaping a single member into a flat bag. Alternatively, the first inner container 2 may be formed by welding two members together. For example, the first inner container 2 may be rectangularly shaped as viewed in the stacking direction of the positive electrode 5, the separator 7, and the negative electrode 6.

For example, the first inner container 2 contains an insulating material. This eliminates the occurrence of short-circuiting of the first power generation element 3 and external environment through the first inner container 2, and therefore the first inner container 2 can protect the first power generation element 3 from external environment. For example, the first inner container 2 contains a resin material. Specific examples of the resin material include polyethylene terephthalate and polyethylene.

Moreover, for example, the first inner container 2 may be given a multi-layer structure. For example, the first inner container 2 may be given a two-layer structure. More specifically, for example, the first inner container 2 contains a thermo-adhesive resin material and a heat-resistant resin material. Specific examples of the thermo-adhesive resin material include resins that melt at temperatures of less than 150° C. Moreover, specific examples of the heat-resistant resin material include resins that melt at temperatures of 150° C. or higher and 300° C. or lower. Examples of the heat-resistant resin material include polyethylene terephthalate and polyethylene naphthalate. Examples of the thermo-adhesive resin material include polyethylene and polypropylene.

In the case where the inner container 2 is rectangularly shaped as viewed in the stacking direction of the first unit cell 100 and the second unit cell 200, for example, the first inner container 2 can be set to a longitudinal length of 55 to 550 mm, a transverse length of 55 to 350 mm, and a thickness of 0.1 to 2.2 mm.

A surface of the first inner container 2 is provided with a convexity 4a that has a curved surface and/or a flat surface. The convexity 4a fixes the first inner container 2 and a second inner container 12. The convexity 4a is shaped in a strip as viewed in the stacking direction of the first inner container 2 and the second inner container 12. For example, the convexity 4a may be quadrangularly shaped. For example, a quadrangular shape corresponds to a rectangular shape having long and short sides. In the case where the convexity 4a is rectangularly shaped, for example, the convexity 4a can be set to a longitudinal length of 300 to 200 mm, a transverse length of 300 to 200 mm, and a thickness of 0.02 to 1 mm.

The first terminal 8 provides electrical connection between a first power generation element 103 and an external apparatus. For example, the first terminal 8 is shaped in a plate. More specifically, for example, the first terminal 8 is quadrangularly shaped as viewed in the stacking direction of the first unit cell 100 and the second unit cell 200. For example, the first terminal 8 may be given a rectangular shape. For example, the rectangular shape may have long and short sides.

The first terminal 8 is kept in contact with the first power generation element 103 as viewed in the stacking direction of the first unit cell 100 and the second unit cell 200. The first terminal 8 is located on one of the outer-periphery sides of the first power generation element 103 as viewed in the direction of stacking the first unit cell 100 and the second unit cell 200. Moreover, the first terminal 8 extends outward beyond the edge of a first inner container 102 for electrical connection with an external apparatus. In a location outside the first inner container 102, the first terminal 8 is electrically connected to an external connection terminal.

For example, the first terminal 8 is constructed of an electroconductive member. For example, the first terminal 8 may contain a metal material. Specific examples of the metal material include aluminum and copper. In the case where the first terminal 8 is shaped in a plate, for example, the first terminal 8 can be set to a longitudinal length of 30 to 100 mm, a transverse length of 10 to 100 mm, and a thickness of 0.1 to 0.5 mm.

Like the first unit cell 100, the second unit cell 200 is a minimum unit of a member which functions as a cell. In the electrochemical cell 20, the first unit cell 100 and the second unit cell 200 are connected in parallel. This makes it possible to increase the capacity of the electrochemical cell 20. The first unit cell 100 and the second unit cell 200 may be connected in series. This makes it possible to increase the voltage of the electrochemical cell 20.

For example, the second unit cell 200 overlies the first unit cell 100 within the outer container 1. The second unit cell 200 includes a second power generation element 13; and the second inner container 12. In the electrochemical cell 20, the second unit cell 200 is identical in shape with the first unit cell 100. Alternatively, for example, the second unit cell 200 may differ in shape from the first unit cell 100. In the electrochemical cell 20, the second unit cell 200 and the first unit cell 100 are stacked together with the respective outer edges in registration. Note that the second unit cell 200 may be placed with its outer edge out of registration with the outer edge of the first unit cell 100.

For example, the material of construction of the second power generation element 13 may contains the material used for the first power generation element 3. More specifically, for example, the second power generation element 13 may be made of the same material as that constituting the first power generation element 3. Alternatively, for example, the second power generation element 13 may differ in material from the first power generation element 3.

In the electrochemical cell 20, the second inner container 12 is identical in shape with the first inner container 2. Alternatively, for example, the second inner container 12 may differ in shape from the first inner container 2. For example, the material of construction of the second inner container 12 may contains the material used for the first inner container 2. More specifically, the second inner container 12 may be made of the same material as that constituting the first inner container 2. Alternatively, for example, the second inner container 12 may differ in material from the first inner container 2.

A surface of the second inner container 12 is provided with a concavity 4b that has a curved surface and/or a flat surface. The concavity 4b fixes the first inner container 2 and the second inner container 12. The concavity 4b is quadrangularly shaped as viewed in the stacking direction of the first inner container 2 and the second inner container 12. For example, the concavity 4b may be given a rectangular shape. For example, the rectangular shape has long and short sides. In the case where the concavity 4b is rectangularly shaped, for example, the concavity 4b can be set to a longitudinal length of 300 to 200 mm, a transverse length of 300 to 200 mm, and a thickness of 0.02 to 1 mm.

For example, the second unit cell 200 is identical in dimensions with the first unit cell 100. Alternatively, for example, the second unit cell 200 may differ in dimensions from the first unit cell 100.

The outer container 1 is a member including a space therein for encasing the first unit cell 100 and the second unit cell 200. The outer container 1 protects the first unit cell 100 and the second unit cell 200 from external environment. More specifically, the outer container 1 protects the first unit cell 100 and the second unit cell 200 from oxygen and moisture in the air. For example, the outer container 1 is shaped in a bag. For example, the outer container 1 is formed by shaping a single member into a bag. Alternatively, the outer container 1 may be formed by welding two members together. The outer container 1 may be rectangularly shaped as viewed in the stacking direction of the first unit cell 100 and the second unit cell 200.

For example, the outer container 1 contains an insulating material. As a result, the external environment, and the first unit cell 100 and the second unit cell 200 are less likely to be short-circuited through the outer container 1, and therefore the outer container 1 can protect the first unit cell 100 and the second unit cell 200 from external environment. For example, a resin material may be used as the insulating material. Specific examples of the resin material include polyethylene terephthalate and polyethylene.

For example, the outer container 1 has a multi-layer structure. For example, the outer container 1 may be given a three-layer structure. Specifically, for example, the outer container 1 includes a first insulating layer; a moisture-proof layer; and a second insulating layer. In this case, for example, the moisture-proof layer is located between the first insulating layer and the second insulating layer. Specifically, for example, the moisture-proof layer may be covered with the first insulating layer and the second insulating layer.

For example, the first insulating layer contains a resin material. Specific examples of the resin material include polyethylene terephthalate and polyethylene naphthalate.

The moisture-proof layer makes it difficult for oxygen and water that have permeated the first resin layer to reach the second resin layer. For example, the moisture-proof layer contains a metal material. Specific examples of the metal material include aluminum and copper.

For example, the second resin layer contains a resin material. Specific examples of the resin material include polyethylene and polypropylene.

The outer container 1, when including the moisture-proof layer, can protect the first unit cell 100 and the second unit cell 200 from oxygen and water that have permeated the first resin layer. As a result, it is possible to reduce the risk of damage to the first unit cell 100 and the second unit cell 200.

In the case where the outer container 1 is rectangularly shaped as viewed in the stacking direction of the first unit cell 100 and the second unit cell 200, for example, the outer container 1 can be set to a longitudinal length of 60 to 600 mm, a transverse length of 60 to 400 mm, and a thickness of 1 to 20 mm.

The fit portion 4 is a portion in which the convexity 4a of the first inner container 2 is fitted in the concavity 4b of the second inner container 12. The fit portion 4 fixes the first unit cell 100 and the second unit cell 200. For example, in the fit portion 4, part of the convexity 4a of the first inner container may be fitted in the concavity 4b of the second inner container.

As shown in FIG. 2, by providing the fit portion 4, the first unit cell 100 and the second unit cell 200 are fixed inside the outer container 1. This makes it possible to reduce the possibility of misregistration of the first unit cell 100 and the second unit cell 200 without the necessity of increasing the size of the electrochemical cell 20, and thereby reduce the risk of impairment of electrical connection reliability of the electrochemical cell 20 while reducing the possibility of partial increase in the thickness of the secured areas of the cells.

As shown in FIG. 2, for example, the fit portion 4 is located between the first power generation element 3 and the second power generation element 13. For example, the fit portion 4 is shaped in a strip as viewed in the stacking direction of the first unit cell 100 and the second unit cell 200. Moreover, for example, the fit portion 4 may be quadrangularly shaped. In the case where the fit portion 4 is quadrangularly shaped, the fit portion 4 may be given the shape of a rounded-corner quadrangle, for example. As a result external force is less likely to concentrate on the corners of the quadrangular fit portion 4, and the risk of damage to the fit portion 4 can be reduced. In the case where the fit portion 4 is rectangularly shaped, for example, the fit portion 4 can be set to a longitudinal length of 300 to 200 mm, a transverse length of 300 to 200 mm, and a thickness of 0.02 to 1 mm.

The fit portion 4 can be formed by stacking the first inner container 102 and a second inner container 112, and applying pressure to part of the stack of the first inner container 102 and the second inner container 112 from above and below by using metallic plates. For example, the metallic plates may be quadrangularly shaped as viewed in the stacking direction. In this case, the fit portion 4 may also be quadrangularly shaped as viewed in the stacking direction.

Moreover, the metallic plates may be given an undulating surface. As a result, it is possible to concurrently form a plurality of fit portions 4 arranged adjacent each other on the surface of the stack of the first inner container 102 and the second inner container 112.

Figure 3:
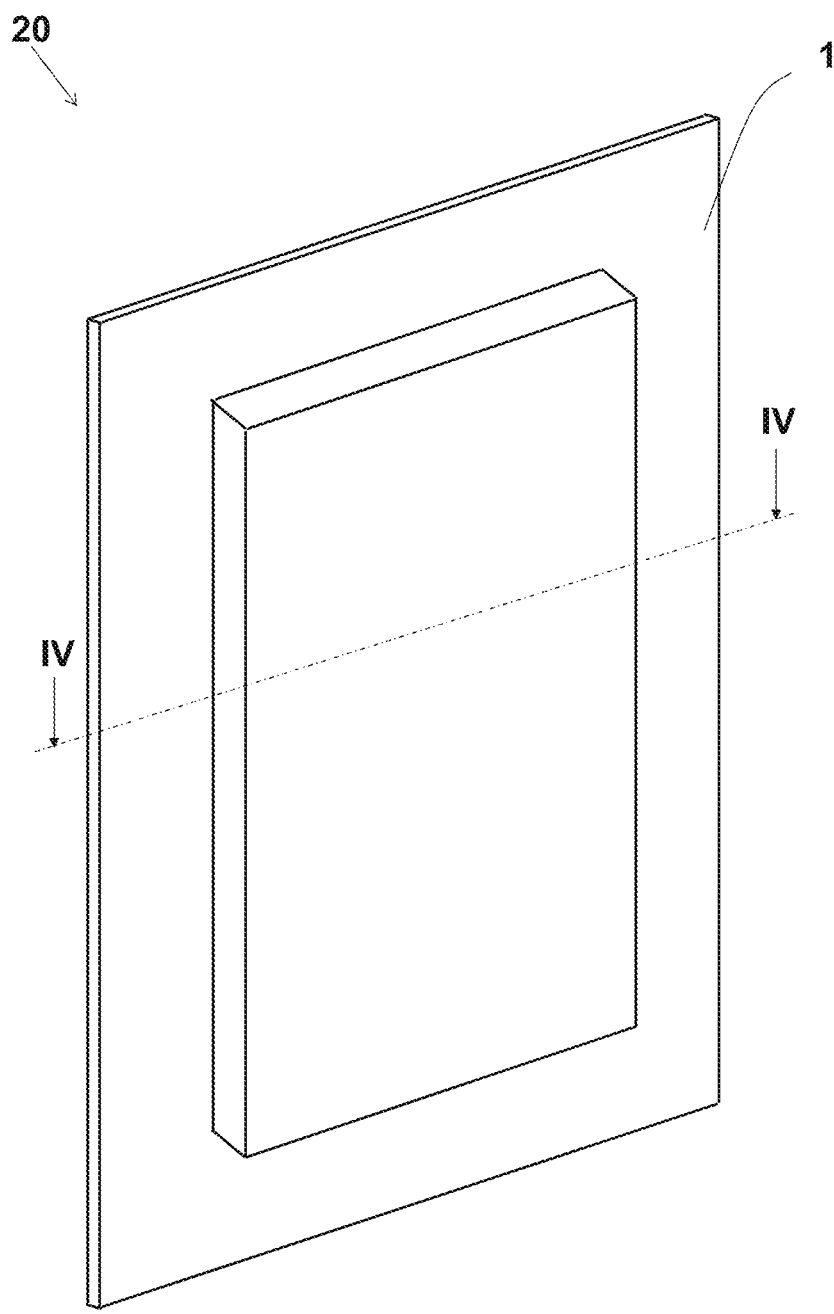
FIG. 3 is a perspective view of another embodiment of the electrochemical cell 20 according to the disclosure.
Figure 4:
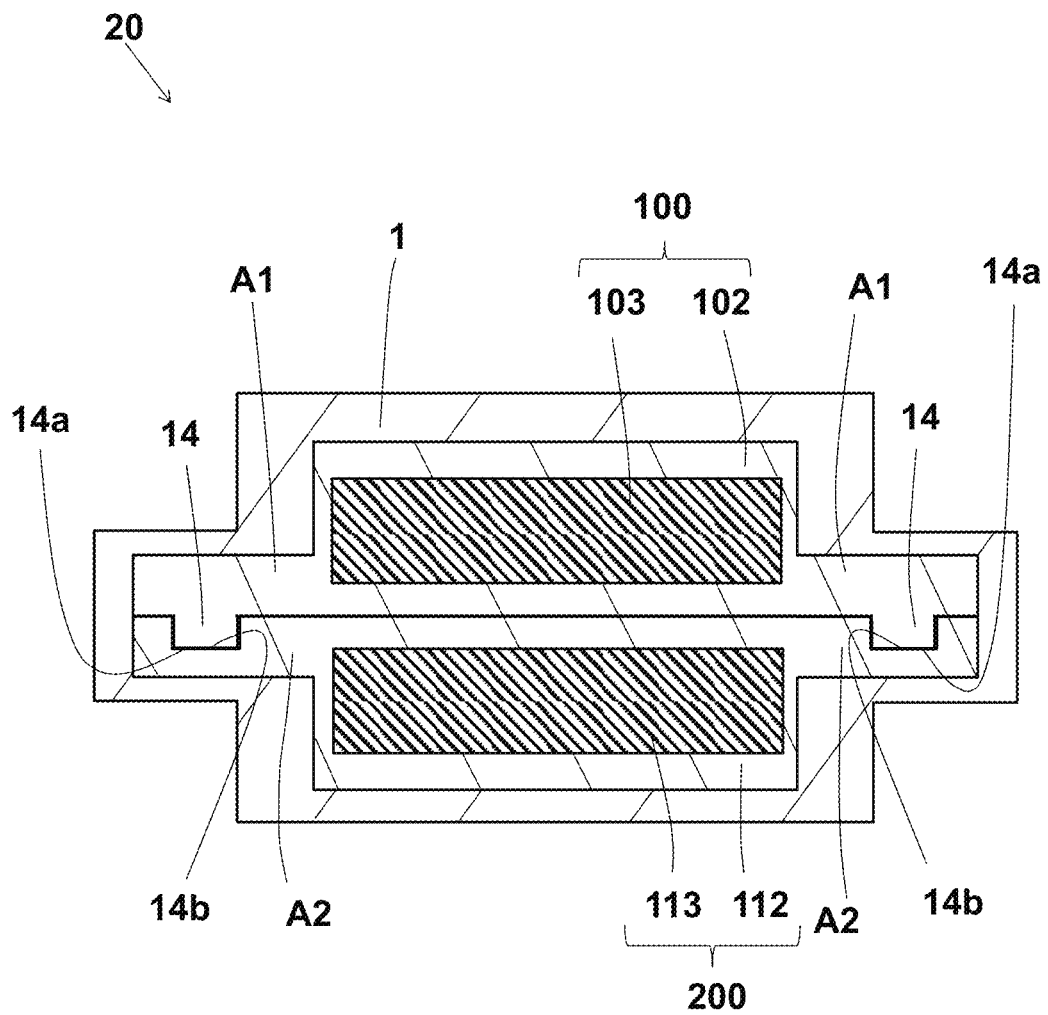
FIG. 4 is a sectional view of the electrochemical cell 20 taken along the line IV-IV shown in FIG. 3.
Figure 5:
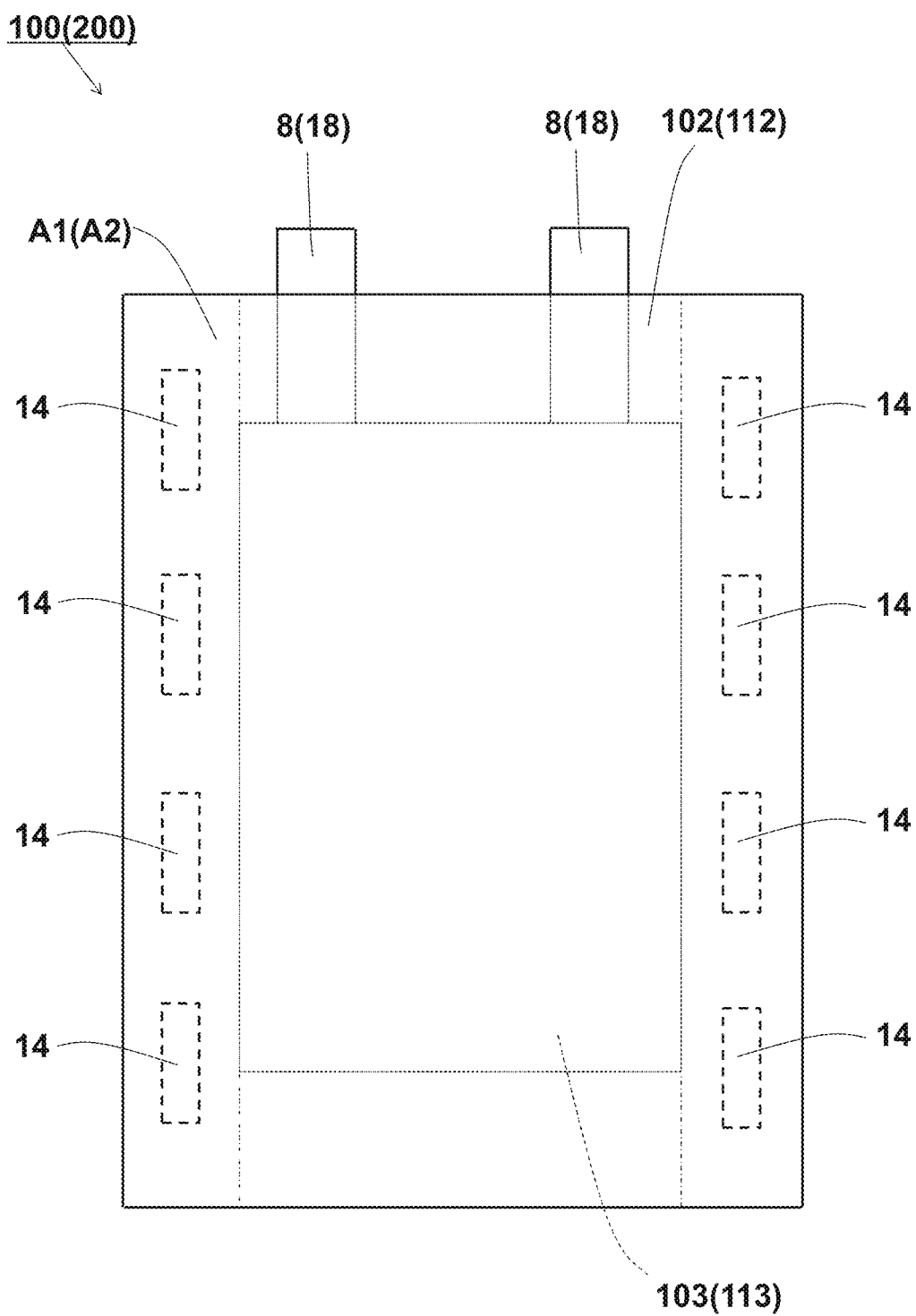
FIG. 5 is a top plan view of a stack of the first unit cell and the second unit cell, taken out of an outer container of the electrochemical cell 20 shown in FIG. 3, as viewed in a stacking direction of the first unit cell and the second unit cell.

Referring to FIGS. 3 to 5, another embodiment of the electrochemical cell 20 according to the disclosure will be described in detail. As shown in FIGS. 3 and 4, the electrochemical cell 20 includes a first unit cell 100; a second unit cell 200; and an outer container 1 which accommodates the first unit cell 100 and the second unit cell 200. Moreover, the first unit cell 100 and the second unit cell 200 are fixed by a fit portion 14.

The first unit cell 100 includes a first power generation element 103; and a first inner container 102. For example, the first power generation element 103 is rectangularly shaped as viewed in the stacking direction of the first unit cell 100 and the second unit cell 200. More specifically, the first power generation element 103 may be given a rectangular shape having long and short sides.

For example, the first inner container 102 is rectangularly shaped as viewed in the stacking direction of the first unit cell 100 and the second unit cell 200. Specifically, for example, the first inner container 102 may be given a rectangular shape having long and short sides. Moreover, the first inner container 102 includes a first marginal edge A1. The first marginal edge A1 is a portion surrounding the first inner container 102. Specifically, the first marginal edge A1 refers to a region extending from the outer periphery of the first inner container 102 to the outer periphery of the first power generation element 103, as viewed in the stacking direction of the first unit cell 100 and the second unit cell 200. That is, the first marginal edge A1 corresponds to a region where the first inner container 102 and the first power generation element 103 are disposed in non-overlapping relation.

The second unit cell 200 includes a second power generation element 113; and a second inner container 112. In the electrochemical cell 20, the second power generation element 113 is identical in shape with the first power generation element 103. Alternatively, the first power generation element 103 and the second power generation element 113 may be made in different shapes. Moreover, the material of construction of the second power generation element 113 may contain the material used for the first power generation element 103. Specifically, for example, the second power generation element 113 may be made of the same material as that constituting the first power generation element 103.

In the electrochemical cell 20, the second inner container 112 is identical in shape with the first inner container 102. Alternatively, for example, the second inner container 112 and the first inner container 102 may be made in different shapes. Moreover, the material of construction of the second inner container 112 may contain the material used for the first inner container 102. More specifically, for example, the second inner container 112 may be made of the same material as that constituting the first inner container 102. Moreover, the second inner container 112 includes a second marginal edge A2. The second marginal edge A2 is a portion surrounding the second inner container 112. Specifically, the second marginal edge A2 refers to a region extending from the outer periphery of the second inner container 112 to the outer periphery of the second power generation element 113, as viewed in the stacking direction of the first unit cell 100 and the second unit cell 200. That is, the second marginal edge corresponds to a region where the second inner container 112 and the second power generation element 113 are disposed in non-overlapping relation.

The first power generation element 103 and the second power generation element 113 are stacked together with the respective long and short sides in registration, as viewed in the stacking direction of the first unit cell 100 and the second unit cell 200. The first inner container 102 and the second inner container 112 are also stacked together with the respective long and short sides in registration, as viewed in the stacking direction of the first unit cell 100 and the second unit cell 200. Note that the positive electrode 5, the separator 7, and the negative electrode 6 of each of the first power generation element 103 and the second power generation element 113 are omitted from FIG. 4.

As shown in FIG. 4, the fit portion 14 is formed by fitting a convexity 14a located on the first marginal edge A1 in a concavity 14b located on the second marginal edge A2. In this case, as contrasted to the case of forming the fit portion 4 by fitting the convexity 4a located in a region where the first inner container 102 and the first power generation element 103 are overlapped, in the concavity 4b located in a region where the second inner container 112 and the second power generation element 113 are overlapped, the fit portion 14 can be spaced away from the first power generation element 103 and the second power generation element 113. This makes it possible to reduce the possibility that the fit portion 14 may apply a stress to the first power generation element 103 and the second power generation element 113, and thereby reduce the risk of adverse effects on the performance capability of the cell.

In FIG. 5, there is shown a top plan view of a stack of the first unit cell 100 and the second unit cell 200, taken out of the outer container 1 of the electrochemical cell 20, as viewed in the stacking direction of the first unit cell 100 and the second unit cell 200. Dotted lines represent the outer periphery of a stack of the first power generation element 103 and the second power generation element 113, as viewed through the first inner container 102 and the second inner container 112 in the stacking direction of the first power generation element 103 and the second power generation element 113. Moreover, respective lines extending from the respective long sides of the first power generation element 103 and the second power generation element 113 is indicated, as an imaginary line, by alternate long and short dashed lines.

As shown in FIGS. 4 and 5, a plurality of fit portions 14 may be provided. In this case, an external force can be distributed between the plurality of fit portions 14, and thus an external force can be less likely to concentrate on a single fit portion 14. This makes it possible to reduce the risk of damage to the fit portion 14.

Moreover, as shown in FIG. 5, the fit portions 14 may be located along the respective long sides of the first power generation element 103 and the second power generation element 113, or along respective lines extending from the respective long sides of the first power generation element 103 and the second power generation element 113. Thereby, since the fit portions 14 along the long side susceptible to an external force are placed, it is possible to reduce the possibility of misregistration of the first unit cell 100 or the second unit cell 200 in the short-side direction. As a result, it is possible to improve reliability of electrical connection of the electrochemical cell more.

Moreover, for example, the fit portion 14 is quadrangularly shaped as viewed in the stacking direction of the first unit cell 100 and the second unit cell 200. Specifically, for example, the fit portion 14 may be given a rectangular shape having long sides. In this case, the fit portion 14 may be placed with its long sides located parallel to the long sides of the first power generation element 103. Thereby, since the fit portion 14 along the long side susceptible to an external force is placed, it is possible to reduce the possibility of misregistration of the first unit cell 100 or the second unit cell 200 in the short-side direction. As a result, it is possible to improve reliability of electrical connection of the electrochemical cell.

Figure 6:
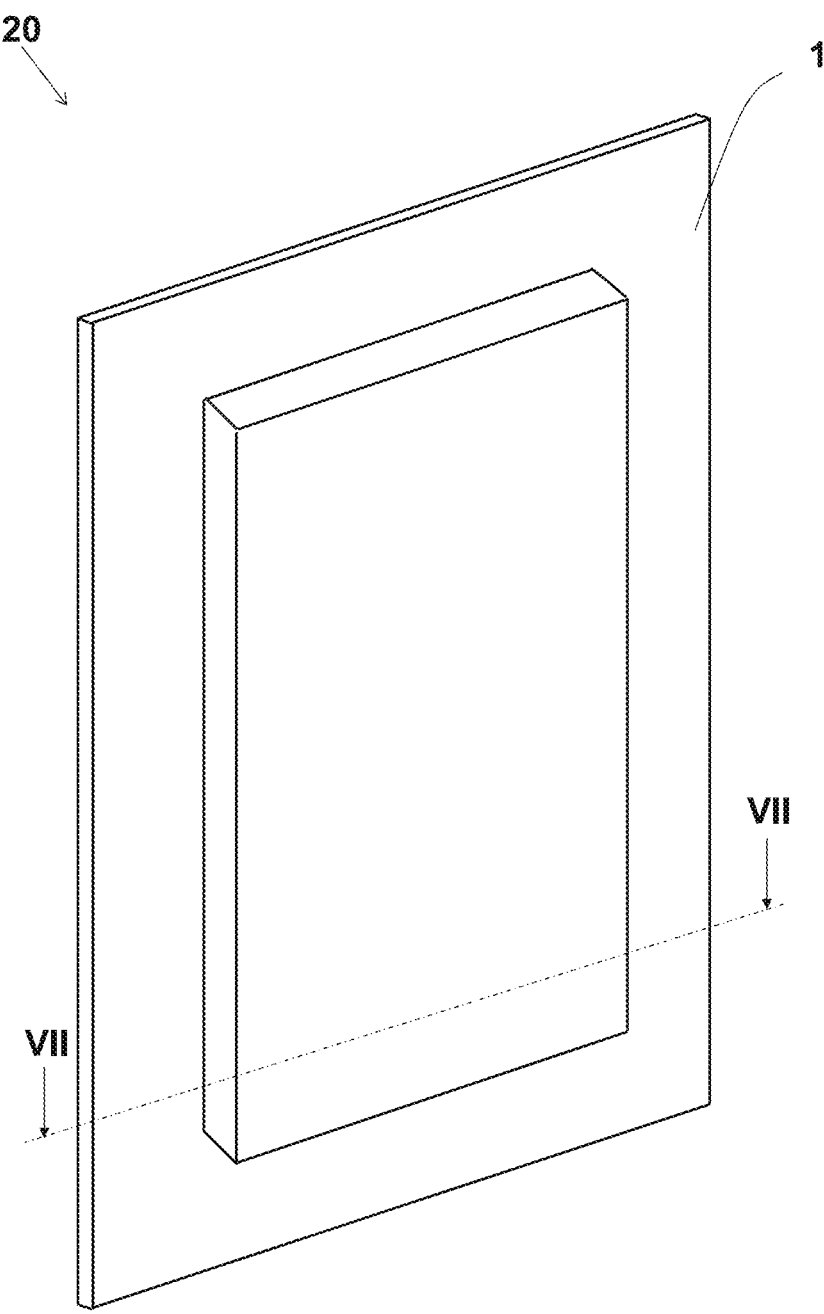
FIG. 6 is a perspective view of still another embodiment of the electrochemical cell 20 according to the disclosure.
Figure 7:
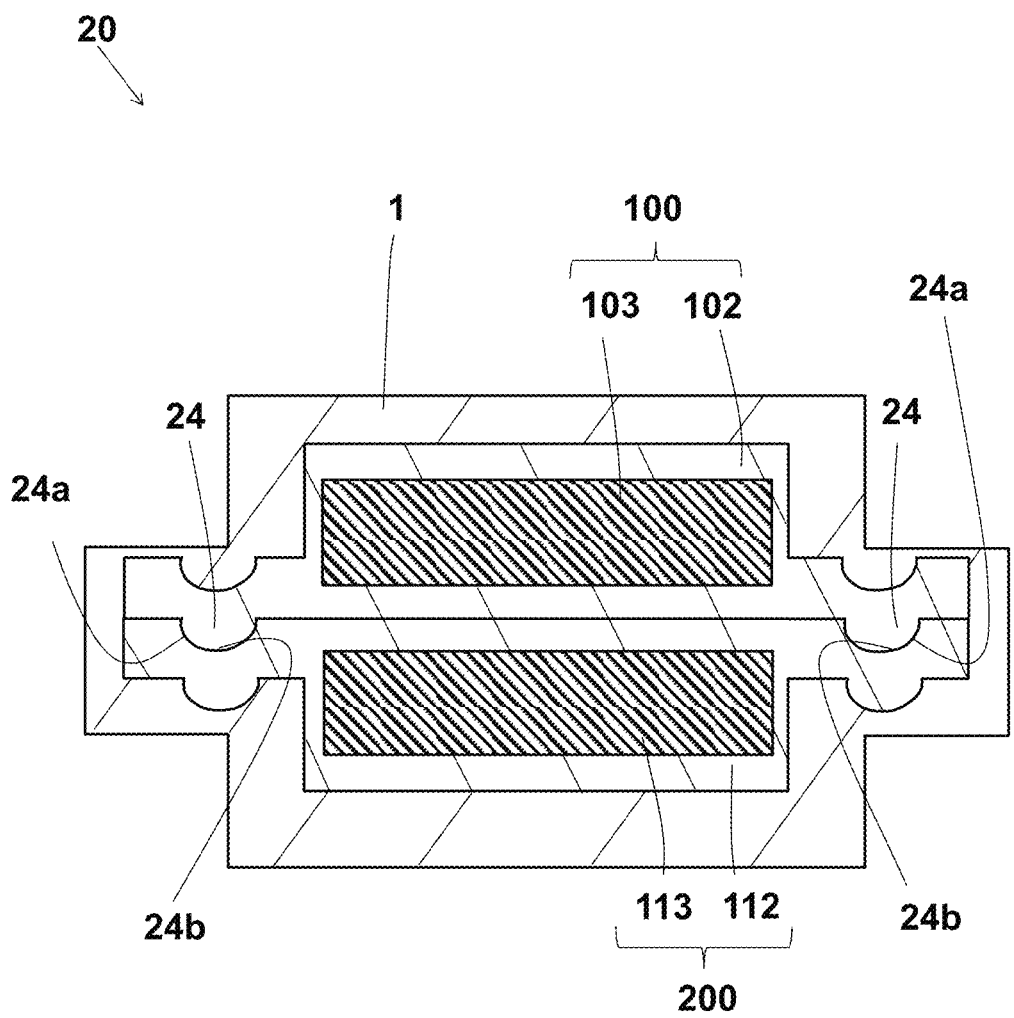
FIG. 7 is a sectional view of the electrochemical cell 20 taken along the line VII-VII shown in FIG. 6.
Figure 8:
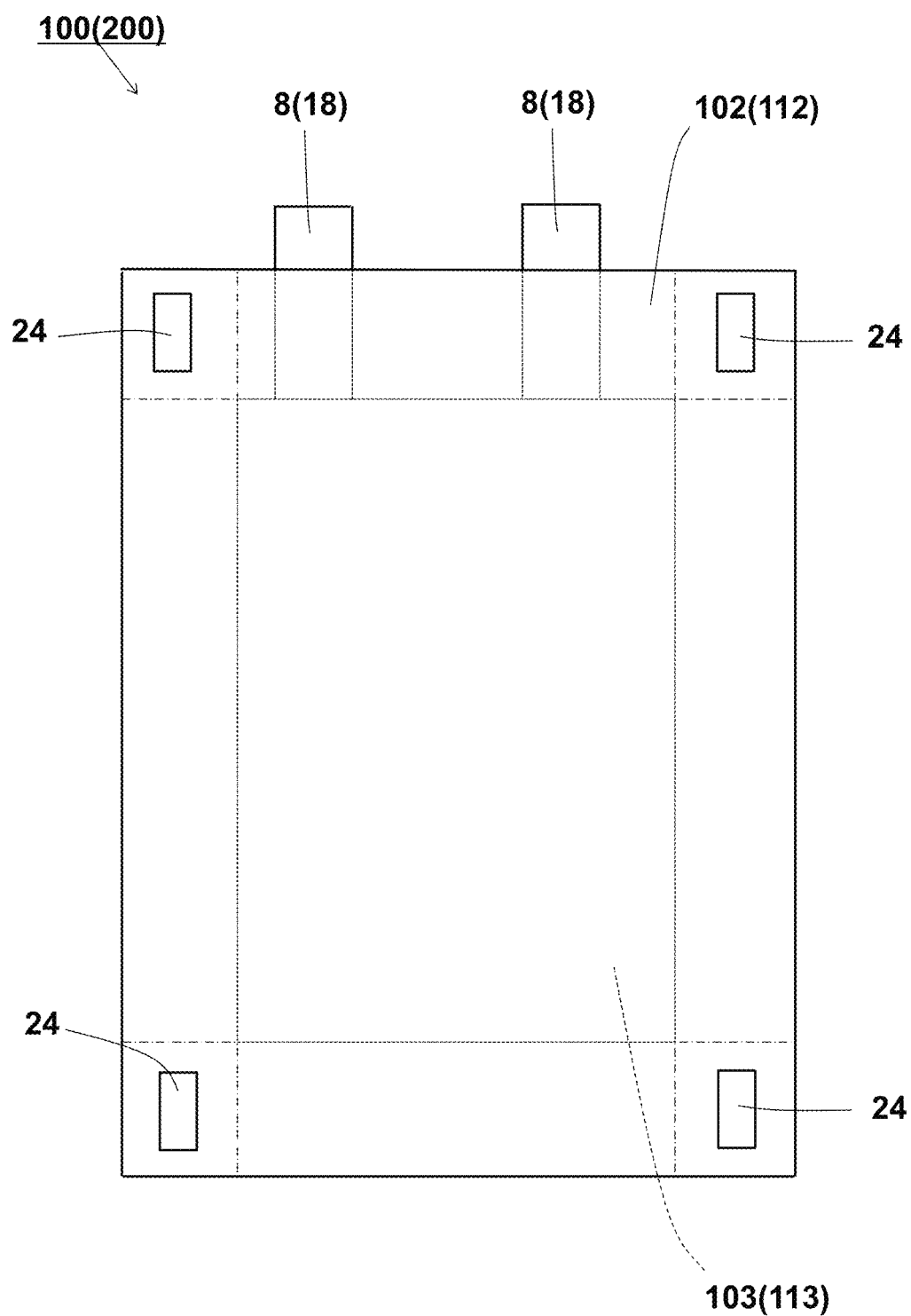
FIG. 8 is a top plan view of a stack of the first unit cell and the second unit cell, taken out of the outer container of the electrochemical cell 20 shown in FIG. 6, as viewed in the direction of stacking the first unit cell and the second unit cell.

Referring to FIGS. 6 to 8, still another embodiment of the electrochemical cell 20 according to the disclosure will be described in detail. As shown in FIGS. 6 and 7, the electrochemical cell 20 includes the first unit cell 100; the second unit cell 200; and the outer container 1 which accommodates the first unit cell 100 and the second unit cell 200. Moreover, the first unit cell 100 and the second unit cell 200 are fixed by a fit portion 24.

In FIG. 8, as in FIG. 5, there is shown a top plan view of the first unit cell 100 and the second unit cell 200 stacked together with the respective long and short sides in registration, taken out of the outer container 1 of the electrochemical cell 20, as viewed in the stacking direction of the first unit cell 100 and the second unit cell 200. Moreover, lines extending from the long side and the short side, respectively, of each of the first power generation element 103 and the second power generation element 113 are indicated, as imaginary lines, by alternate long and short dashed lines.

As shown in FIG. 8, the fit portion 24 may be located at each of the four corners of each of the first marginal edge A1 and the second marginal edge A2. More specifically, the four corners of each of the first and second marginal edges A1 and A2 each refer to a region surrounded by lines extending from the long sides of each of the first power generation element 103 and the second power generation element 113, lines extending from the short sides of each of the first power generation element 103 and the second power generation element 113, and the outer periphery of each of the first inner container 102 and the second inner container 112. In this case, the first unit cell 100 and the second unit cell 200, at their corner areas susceptible to the concentration of external force, can become resistant to deformation. This makes it possible to improve reliability of electrical connection of the electrochemical cell.

Moreover, as shown in FIGS. 7 and 8, there is provided a convexity 24a which is, when viewed in section perpendicular to the stacking direction passing through the convexity 24a, defined by a curve in the first inner container 102. There is also provided a concavity 24b which is, when viewed in section perpendicular to the stacking direction passing through the concavity 24b, defined by a curve in the second inner container 112. In the electrochemical cell 20, the fit portion 24 is formed by fitting the convexity 24a made as a projection of the first inner container 102 in the concavity 24b made as a curved recess of the second inner container 112. More specifically, for example, the fit portion 24 may be formed by bending the stacked first and second inner containers 102 and 112. In this case, it is possible to reduce the risk of damage to the fit portion 24 by applying a local load to the fit portion 24-forming film.

Figure 9:
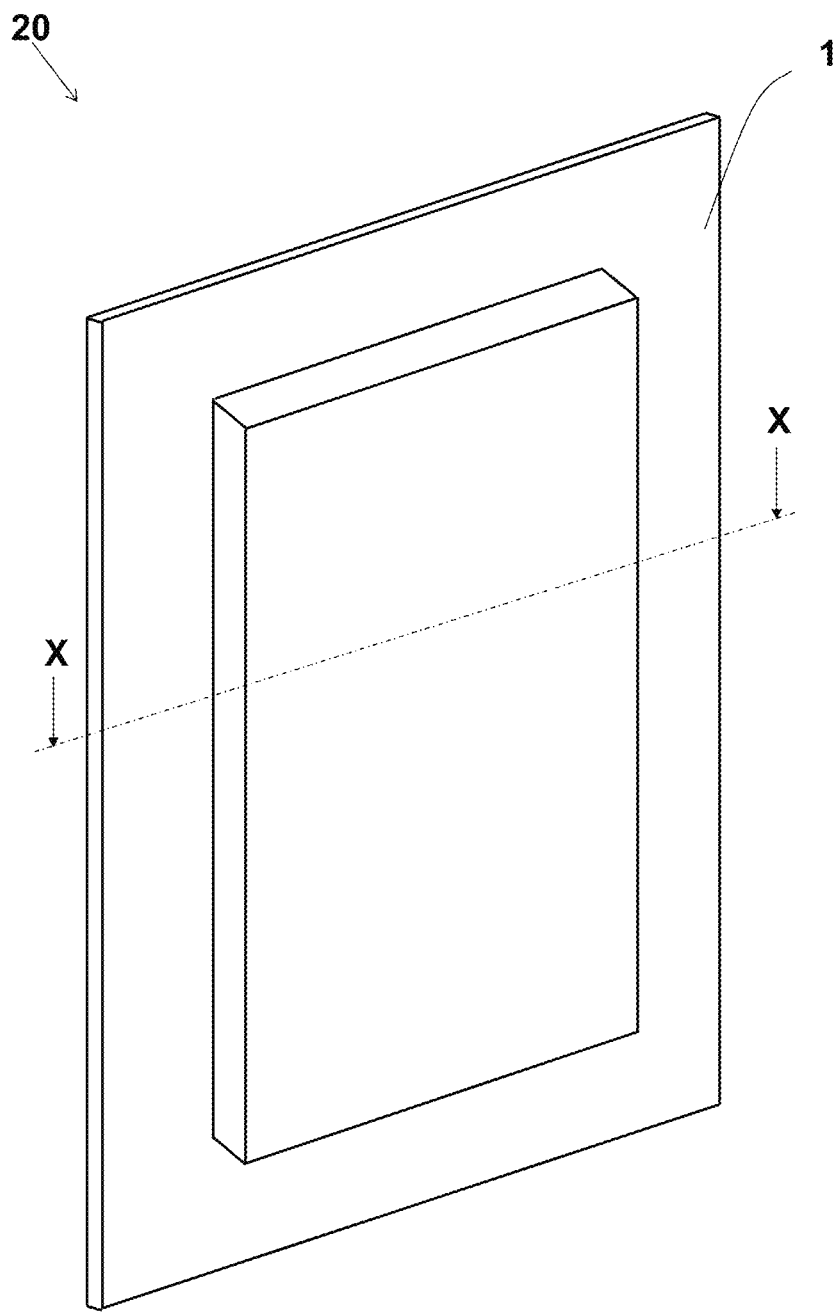
FIG. 9 is a perspective view of still another embodiment of the electrochemical cell 20 according to the disclosure.
Figure 10:
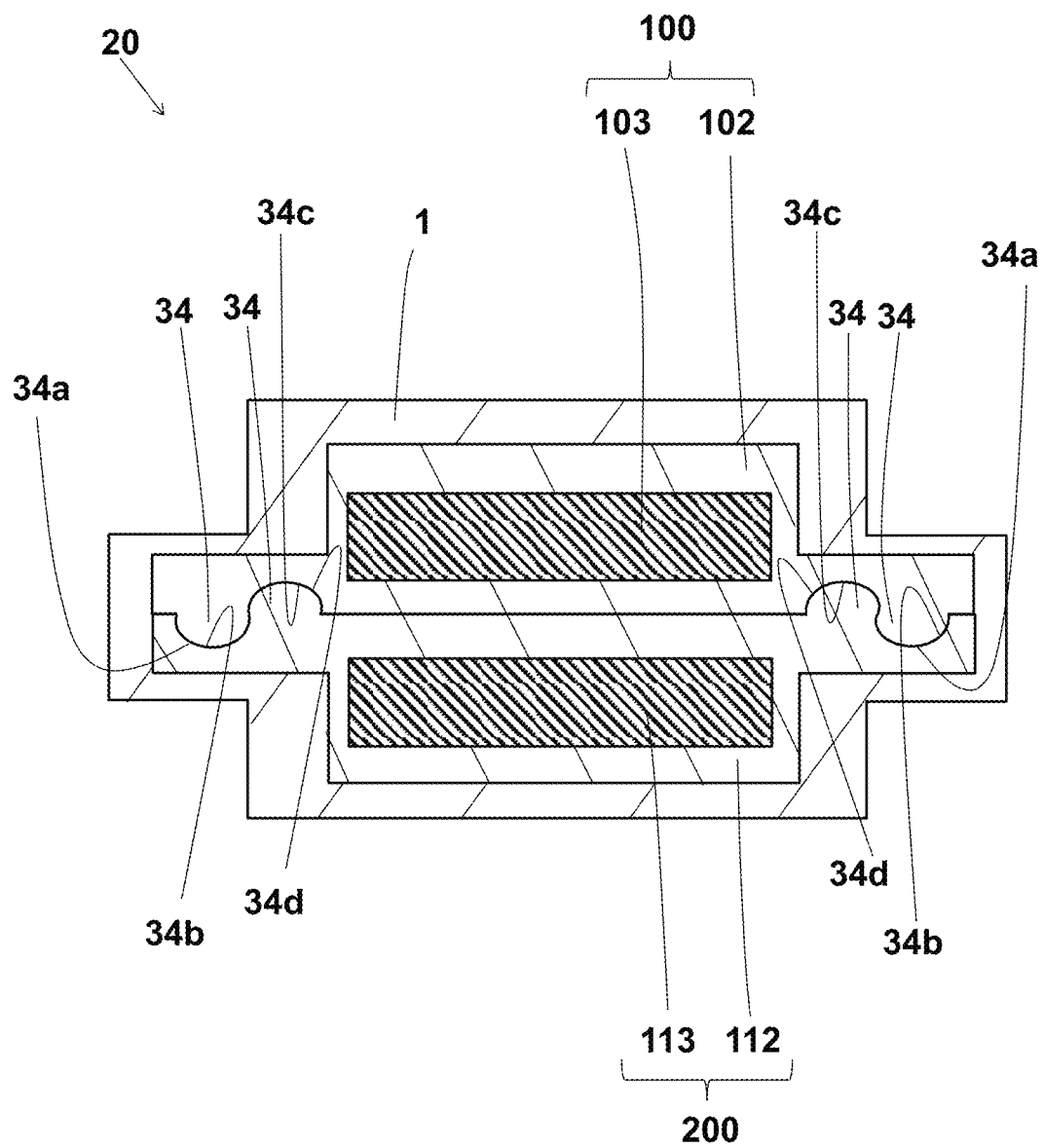
FIG. 10 is a sectional view of the electrochemical cell 20 taken along the line X-X shown in FIG. 9.
Figure 11:
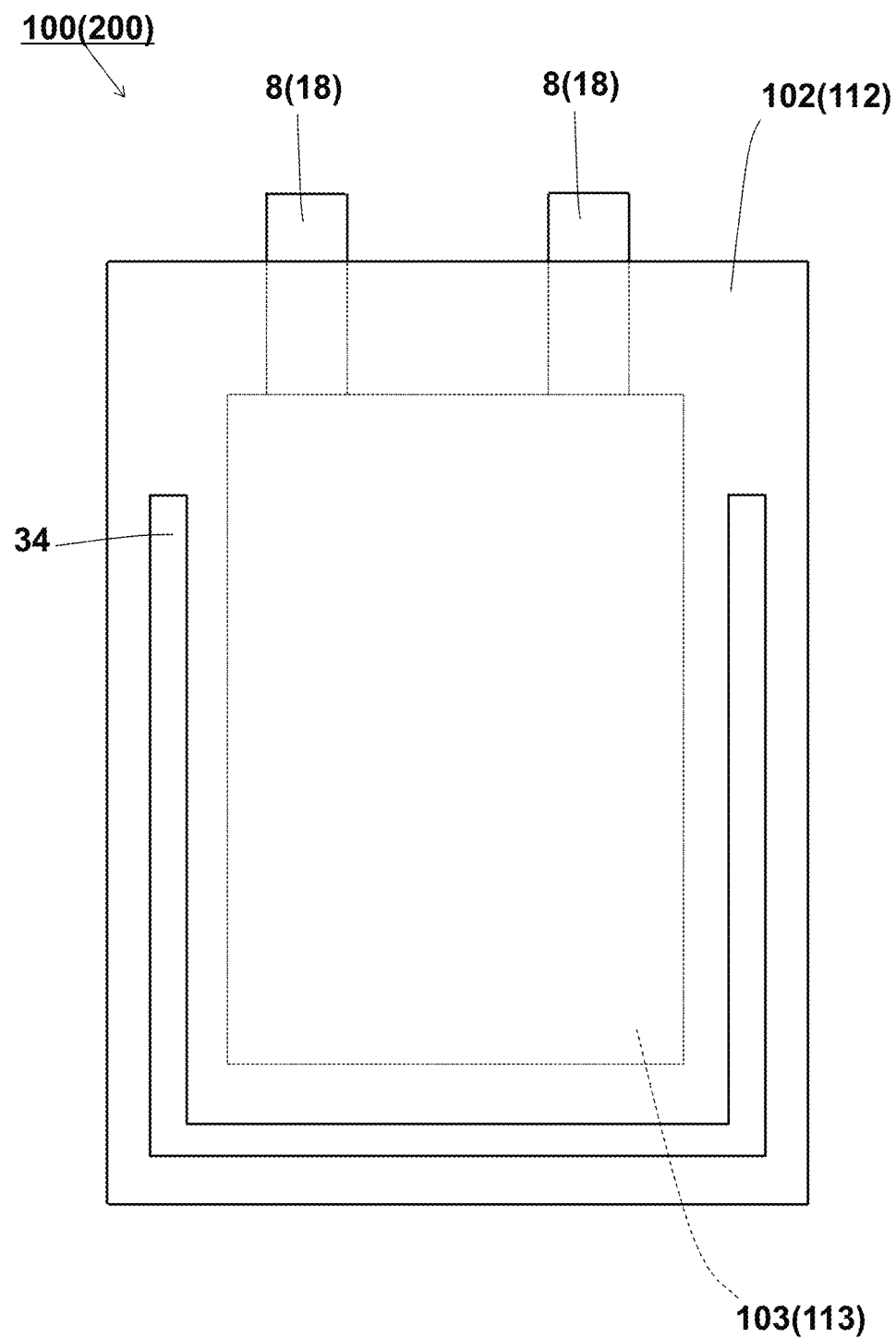
FIG. 11 is a top plan view of a stack of the first unit cell and the second unit cell, taken out of the outer container of the electrochemical cell 20 shown in FIG. 9, as viewed in the direction of stacking the first unit cell and the second unit cell.

Referring to FIGS. 9 to 11, still another embodiment of the electrochemical cell 20 according to the disclosure will be described in detail. In FIG. 11, as in FIG. 8, there is shown a top plan view of the first unit cell 100 and the second unit cell 200 stacked together with the respective long and short sides in registration, taken out of the outer container 1 of the electrochemical cell 20, as viewed in the stacking direction of the first unit cell 100 and the second unit cell 200.

A surface of the first inner container 102 is provided with, in addition to a convexity 34a, a concavity 34c contiguous to the convexity 34a. The concavity 34c of the first inner container 102 is configured to fix the first inner container 102 and the second inner container 112. The concavity 34c of the first inner container 102 is quadrangularly shaped as viewed in the stacking direction of the first inner container 102 and the second inner container 112. Moreover, for example, the concavity 34c of the first inner container 102 may be given a rectangular shape. For example, the rectangular shape may have long and short sides. In the case where the concavity 34c of the first inner container 102 is rectangularly shaped, for example, the concavity 34c of the first inner container 102 can be set to a longitudinal length of 10 to 200 mm, a transverse length of 1 to 5 mm, and a depth of 0.02 to 1 mm.

Moreover, a surface of the second inner container 112 is provided with, in addition to a concavity 34b, a convexity 34d contiguous to the concavity 34b. The convexity 34d of the second inner container 112 is configured to fix the first inner container 102 and the second inner container 112. The convexity 34d of the second inner container 112 is quadrangularly shaped as viewed in the stacking direction of the first inner container 102 and the second inner container 112. Moreover, for example, the convexity 34d of the second inner container 112 may be given a rectangular shape. For example, the rectangular shape may have long and short sides. In the case where the convexity 34d of the second inner container 112 is rectangularly shaped, for example, the convexity 34d of the second inner container 112 can be set to a longitudinal length of 10 to 200 mm, a transverse length of 1 to 5 mm, and a depth of 0.02 to 1 mm.

a fit portion 34 includes a portion in which the convexity 34a of the first inner container is fitted in the concavity 34b of the second inner container, and a portion in which the convexity 34d of the second inner container 112 is fitted in the concavity 34c of the first inner container 102. Thus constructed, since the fit portion 34 is resistant to damage, it is possible improve reliability of electrical connection of the electrochemical cell. In FIG. 11, dotted lines represent that parts of the first terminal 8, as well as a second terminal 18, and the first inner container 102, as well as the second inner container 112, disposed in overlapping relation as viewed in the direction of stacking the first unit cell 100 and the second unit cell 200.

The number of unit cells constituting the electrochemical cell is not limited to two. The electrochemical cell may include three or more unit cells. In this case, the fit portion 34 may fix at least two out of three or more unit cells.

Figure 12:
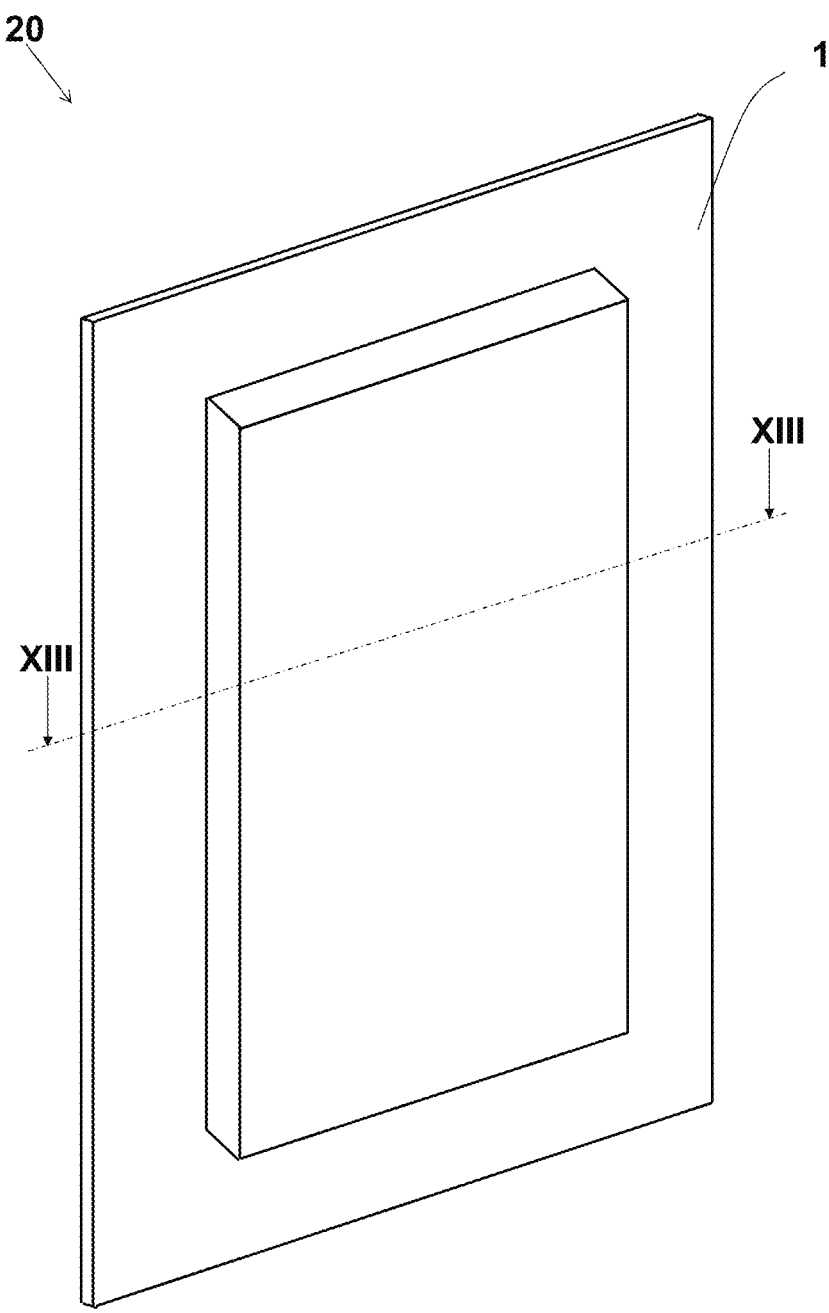
FIG. 12 is a perspective view of still another embodiment of the electrochemical cell 20 according to the disclosure.
Figure 13:
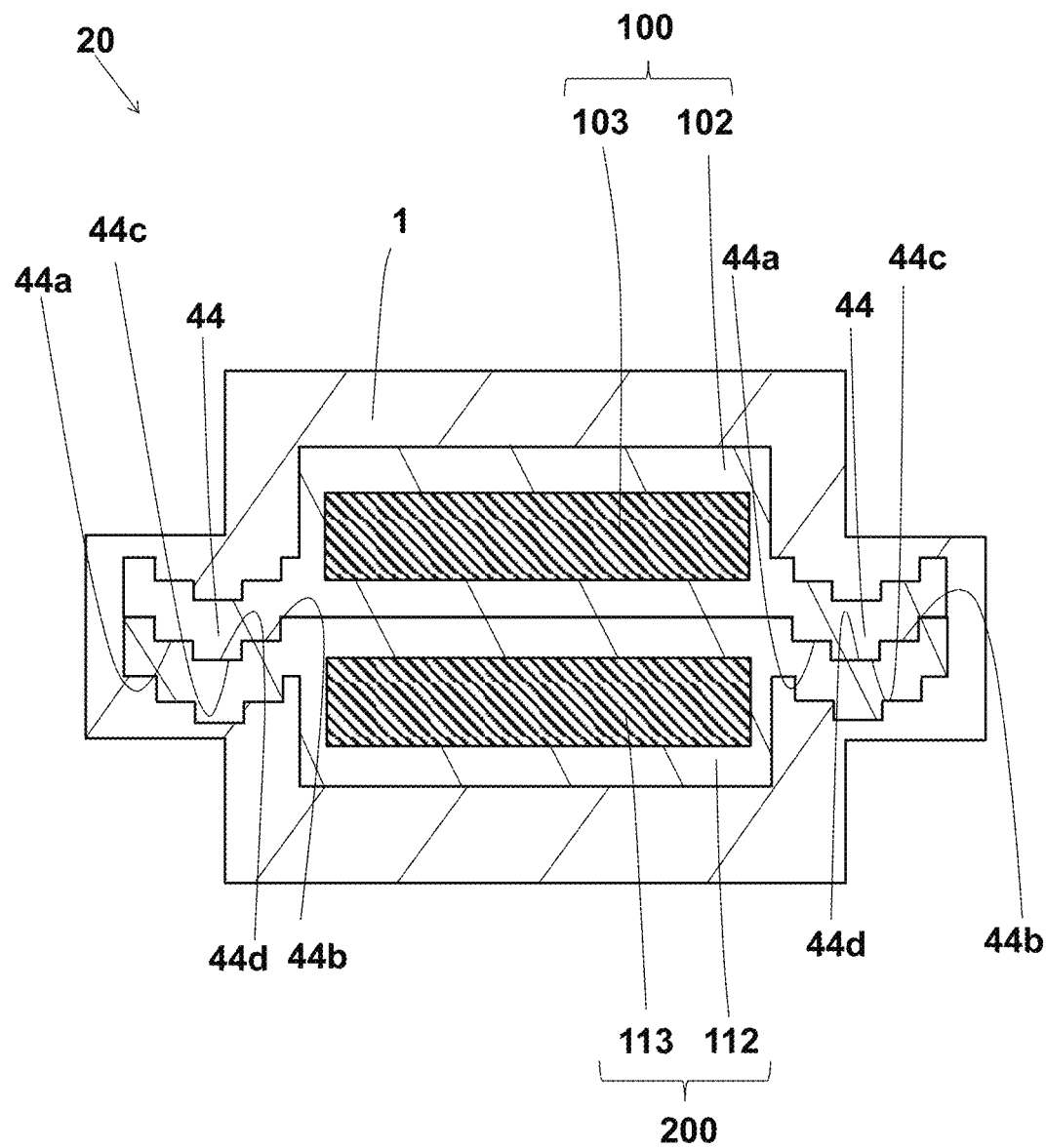
FIG. 13 is a sectional view of the electrochemical cell 20 taken along the line XIII-XIII shown in FIG. 12.

Referring to FIGS. 12 and 13, still another embodiment of the electrochemical cell 20 according to the disclosure will be described in detail. As shown in FIGS. 12 and 13, the electrochemical cell 20 includes the first unit cell 100; the second unit cell 200; and the outer container 1 which accommodates the first unit cell 100 and the second unit cell 200. Moreover, the first unit cell 100 and the second unit cell 200 are fixed by a fit portion 44. In the electrochemical cell 20, the first unit cell 100 and the second unit cell 200 are fixed by the third fit portion 44. That is, the third fit portion 44 fixes the first unit cell 100 and the second unit cell 200.

The first inner container 102 includes a third convexity 44a and a fourth convexity 44b located on the surface of the third convexity 44a. The third convexity 44a fixes the first inner container 102 and the second inner container 112.

The second inner container 112 includes a third concavity 44c and a fourth concavity 44d located on the surface of the third concavity 44c.

The third fit portion 44 is formed by fitting the third convexity 44a in the third concavity 44c, and fitting the fourth convexity 44b in the fourth concavity 44d. Thus constructed, the third fit portion 44 is resistant to convexity-concavity disengagement, and the first unit cell 100 and the second unit cell 200 can be more strongly fixed. This makes it possible to improve reliability of electrical connection of the electrochemical cell 20.

Figure 14:
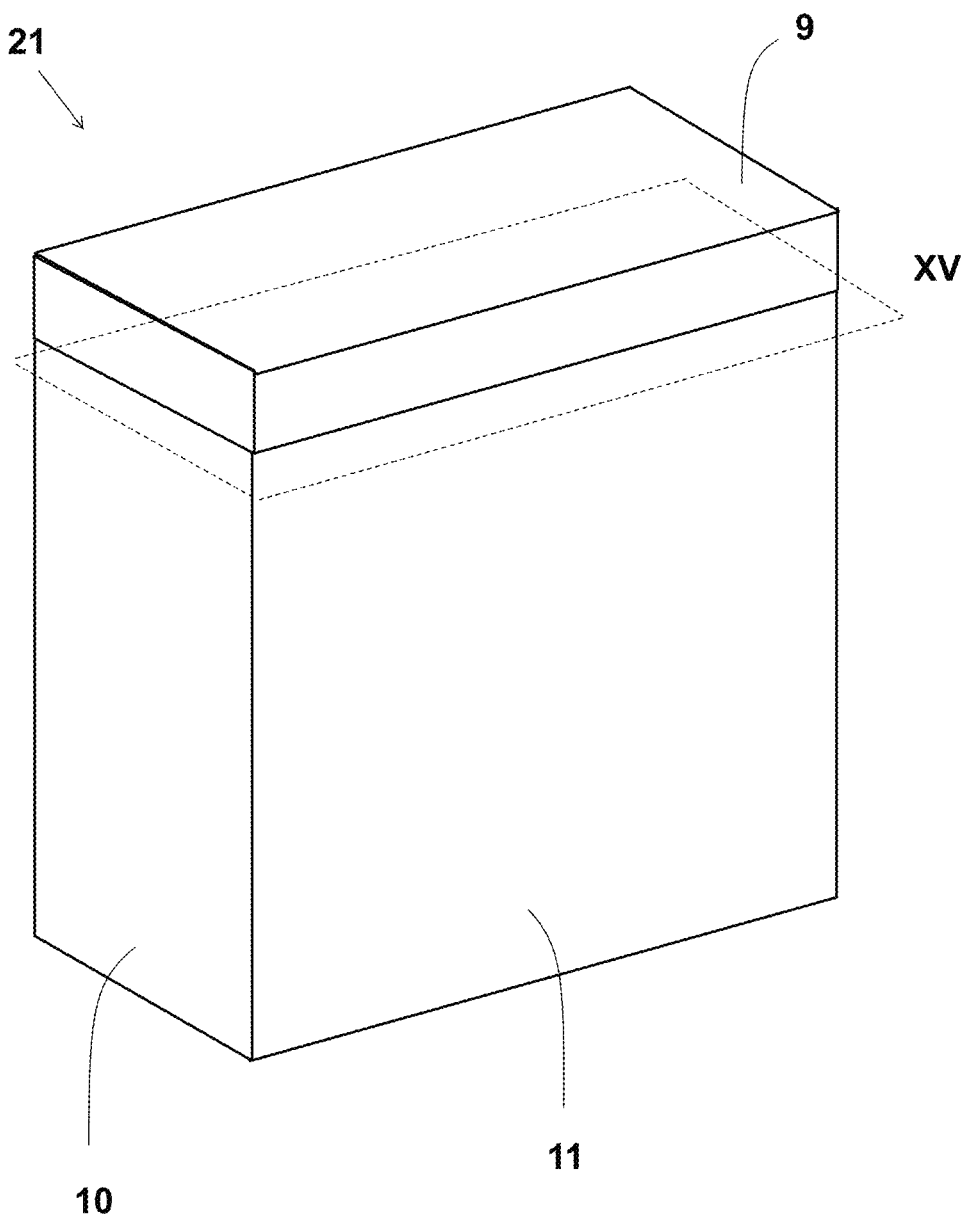
FIG. 14 is a perspective view of an embodiment of an electrochemical cell module according to the disclosure.
Figure 15:
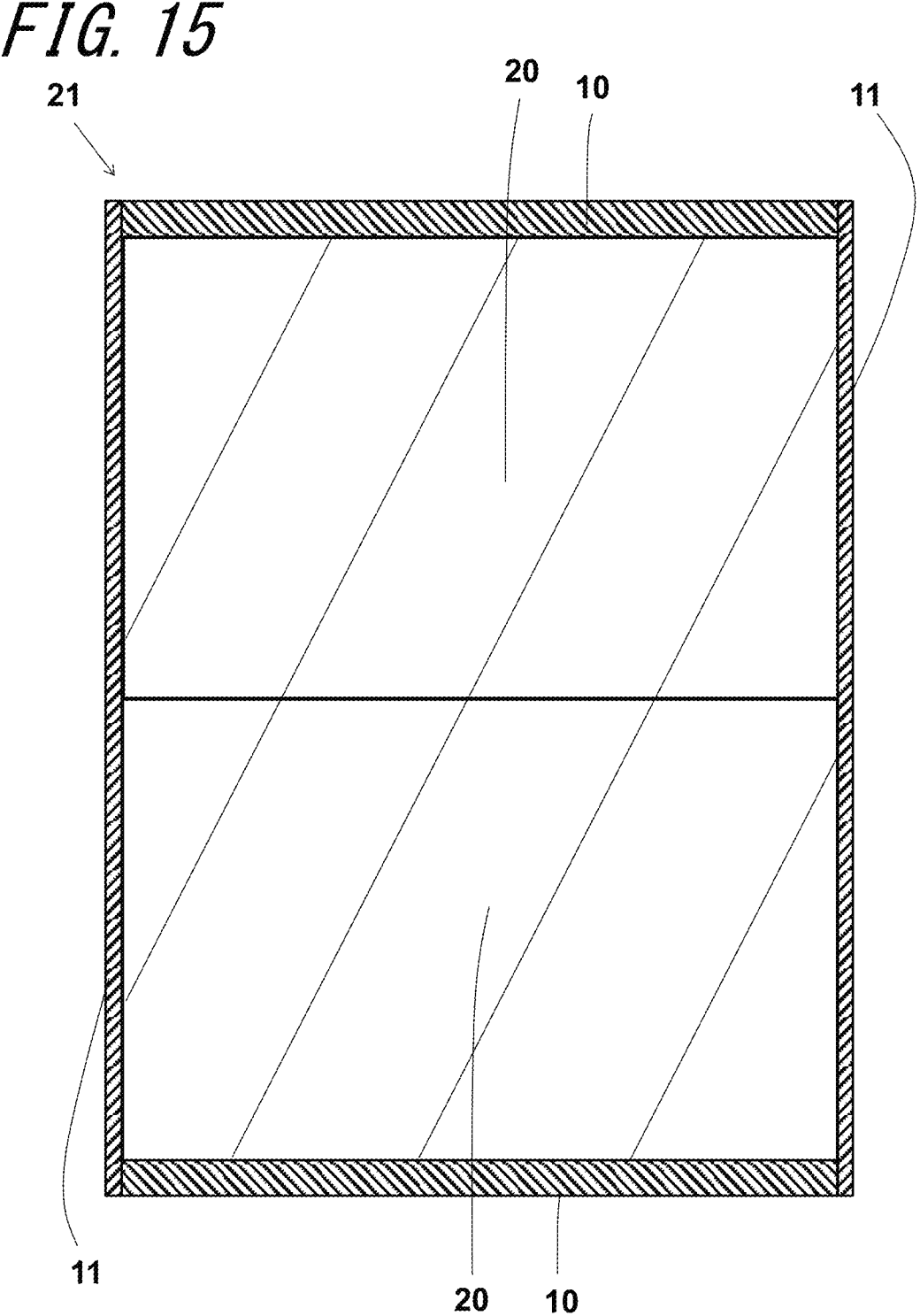
FIG. 15 is a sectional view of the electrochemical cell module taken along the cutting plane XV shown in FIG. 14.

Referring to FIGS. 14 and 15, an embodiment of an electrochemical cell module 21 according to the disclosure will be described in detail. The electrochemical cell module 21 includes a housing; a first electrochemical cell located inside the housing; and a second electrochemical cell located inside the housing. The first electrochemical cell and the second electrochemical cell are electrically connected to each other.

For example, the housing contains a metal material. This provides greater rigidity in the housing, and can be less likely to transmit an external force derived from external environment to the first electrochemical cell and the second electrochemical cell. Thus, the housing can protect the first electrochemical cell and the second electrochemical cell from external environment. Examples of the metal material include aluminum and stainless steel. In this case, heat generated in the electrochemical cell is readily transmitted to the housing with the consequent increase in heat-dissipation efficiency. This makes it possible to reduce the risk of deterioration in cell characteristics.

For example, the housing may include a plurality of members. For example, the housing may include two principal-surface plates 10; two side-surface plates 11; a bottom-surface plate; and a terminal cover 9. Specifically, the housing may be constructed of a combination of a metal material and a resin material.

The terminal cover 9 protects each of the terminals of the stacked first and second electrochemical cells. The terminal cover 9 therefore faces the terminals of the stacked first and second electrochemical cells. For example, the terminal cover 9 may be rectangularly shaped as viewed from the terminals of the first electrochemical cell and the second electrochemical cell. For example, the terminal cover 9 may be made of a resin material. Examples of the resin material include polyethylene terephthalate and polyethylene naphthalate. In the case where the terminal cover 9 is rectangularly shaped, for example, the terminal cover 9 may have a longitudinal length of 200 to 600 mm, a transverse length of 50 to 300 mm, and a thickness of 0.1 to 5 mm.

The principal-surface plate 10 protects the principal surfaces of, respectively, the first electrochemical cell and the second electrochemical cell. The principal-surface plate 10 therefore faces the principal surfaces of the first and second electrochemical cells. The principal-surface plate 10 may be rectangularly shaped as viewed in the stacking direction of the first electrochemical cell and the second electrochemical cell. For example, the principal-surface plate 10 contains a metal material. Specific examples of the metal material include aluminum and stainless steel. In this case, heat generated in the first electrochemical cell and the second electrochemical cell is readily transmitted to the exterior of the module, and thus the risk of deterioration in cell characteristics can be reduced.

Moreover, for example, the principal-surface plate 10 may contain a resin material. Examples of the resin material include high-melting-point resin materials resistant to heat. Examples of the heat-resistant resin material include polyethylene terephthalate (PET). In this case, since electrical isolation between the principal-surface plate and the first electrochemical cell or the second electrochemical cell can be improved, this makes it possible to reduce the risk of short-circuiting of the first electrochemical cell or the second electrochemical cell and external environment. In the case where the principal-surface plate 10 is rectangularly shaped, the principal-surface plate 10 may have a longitudinal length of 200 to 600 mm, a transverse length of 50 to 300 mm, and a thickness of 0.5 to 5 mm.

The side-surface plate 11 protects the side surfaces of, respectively, the first electrochemical cell and the second electrochemical cell. The side-surface plate 11 therefore faces the side surfaces of the first and second electrochemical cells. Moreover, for example, the side-surface plate 11 may be kept in contact with the first electrochemical cell and the second electrochemical cell. For example, the side-surface plate 11 may be rectangularly shaped as viewed in a direction perpendicular to the side surfaces of the first and second electrochemical cells. Moreover, for example, the side-surface plate 11 contains a metal material. Specifically, the side-surface plate 11 may contain aluminum or stainless steel, for example. In this case, heat generated in the first electrochemical cell and the second electrochemical cell is readily transmitted to the exterior of the module. This makes it possible to reduce the risk of deterioration in cell characteristics.

Moreover, for example, the side-surface plate 11 may contain a resin material. Examples of the resin material include heat-resistant resin materials. Examples of the heat-resistant resin material include PET. In this case, since electrical isolation between the side-surface plate and the first electrochemical cell, as well as the second electrochemical cell, can be improved, this makes it possible to reduce the risk of short-circuiting of the first electrochemical cell or the second electrochemical cell and external environment. In the case where the side-surface plate 11 is rectangularly shaped as viewed in a direction perpendicular to the side surfaces of the first and second electrochemical cells, for example, the side-surface plate 11 may have a longitudinal length of 200 to 600 mm, a transverse length of 50 to 300 mm, and a thickness of 0.5 to 5 mm.

The bottom-surface plate protects a bottom surface which is located opposite to the surface with the terminals of the first electrochemical cell and the second electrochemical cell. The bottom-surface plate may therefore be kept in contact with the bottom surface which is located opposite to the surface with the terminals of the first electrochemical cell and the second electrochemical cell. The bottom-surface plate may be rectangularly shaped as viewed in a direction perpendicular to the bottom surface which is located opposite to the surface with the terminals of the first electrochemical cell and the second electrochemical cell. Moreover, for example, the bottom-surface plate contains a metal material. Examples of the metal material include aluminum and stainless steel. In this case, heat generated in the first electrochemical cell and the second electrochemical cell is readily transmitted to the exterior of the module. This makes it possible to reduce the risk of deterioration in cell characteristics.

Moreover, for example, the bottom-surface plate may contain a resin material. Examples of the resin material include heat-resistant resin materials. Examples of the heat-resistant resin material include PET. In this case, electrical isolation between the bottom-surface plate and the first electrochemical cell, as well as the second electrochemical cell, can be improved, this makes it possible to reduce the risk of short-circuiting of the first electrochemical cell or the second electrochemical cell and external environment. Moreover, the bottom-surface plate may be obtained by bending part of the side-surface plate 11 or the principal-surface plate 10. In the case where the bottom-surface plate is rectangularly shaped as viewed in a direction perpendicular to the surface which is located opposite to the surface with the terminals of the first electrochemical cell and the second electrochemical cell, the bottom-surface plate may have a longitudinal length of 200 to 600 mm, a transverse length of 50 to 300 mm, and a thickness of 0.5 to 5 mm.

The first electrochemical cell and the second electrochemical cell are electrically connected to each other. In the electrochemical cell module 21, for example, the first electrochemical cell and the second electrochemical cell may be connected in parallel. This makes it possible to increase the capacity of the electrochemical cell module 21. Moreover, in the electrochemical cell module 21, for example, the first electrochemical cell and the second electrochemical cell may be connected in series. This makes it possible to increase the voltage of the electrochemical cell module 21.

Figure 16:
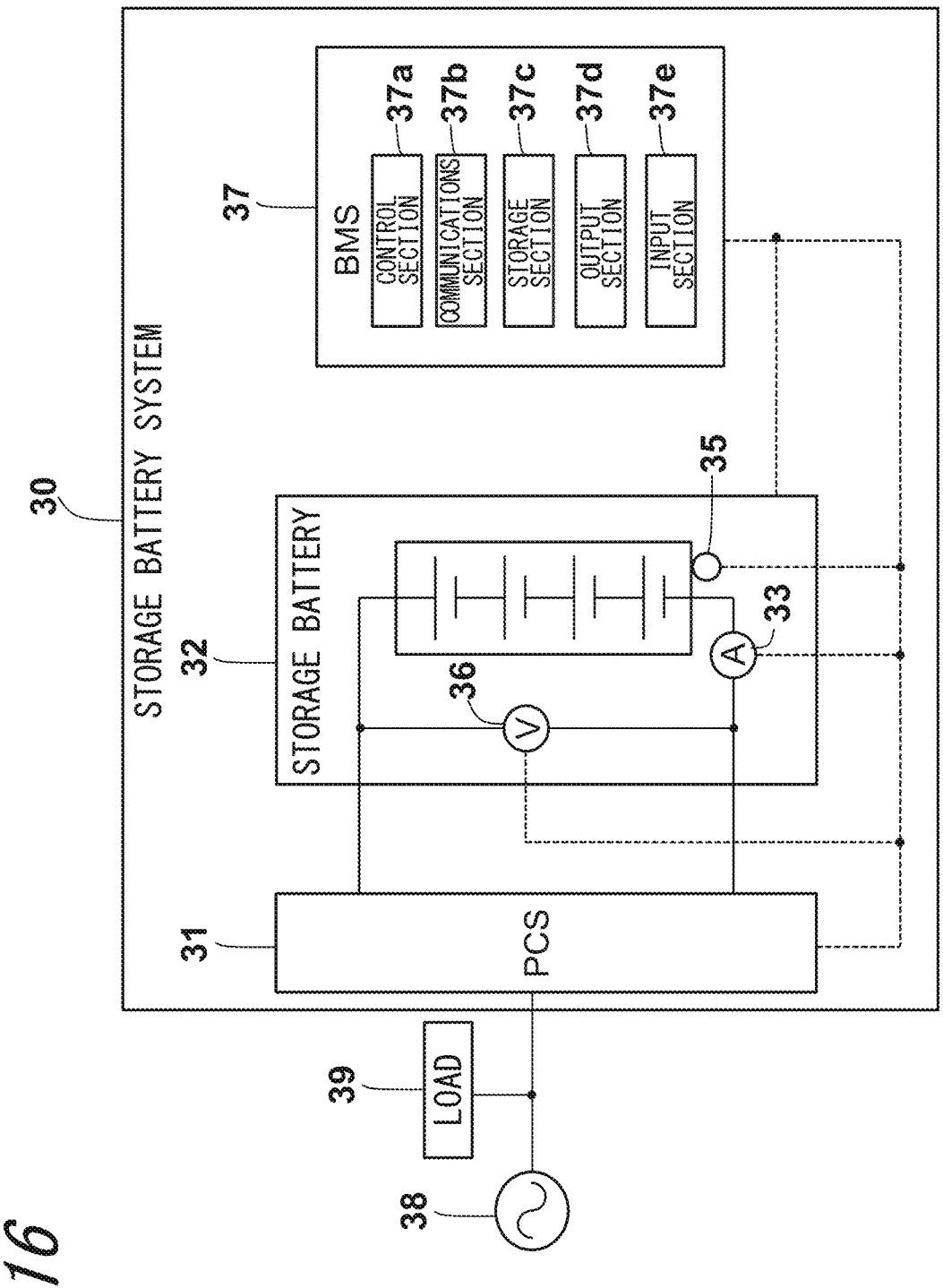
FIG. 16 is a schematic diagram of an embodiment of a storage battery system according to the disclosure.

Referring to FIG. 16, an embodiment of a storage battery system 30 according to the disclosure will be described in detail. The storage battery system 30 includes a power conditioner 31; a storage battery; a current sensor 33; a temperature sensor 35; a voltage sensor 36; and a storage battery management unit 37. The power conditioner 31 is also referred to as "PCS (Power Conditioning System)". The storage battery management unit 37 is also referred to as "BMS (Battery Management System)". In the storage battery system 30, the storage battery is connected via the power conditioner 31 to the exterior of the storage battery system 30, such as a power system 38, a load 39, etc. Thus constructed, the storage battery system 30 can supply the power system 38, the load 39, etc. with electric power stored in the storage battery in a charged condition. Alternatively, the storage battery system 30 charges the storage battery with electric power supplied from the power system 38, etc.

As indicated by dashed lines in FIG. 16, the power conditioner 31, the storage battery, the current sensor 33, the temperature sensor 35, the voltage sensor 36, and the storage battery management unit 37 are communicatively connected to each other via a network such as a CAN (Controller Area Network) by wired or wireless connection. While, as shown in FIG. 16, the embodiment of the storage battery system 30 according to the disclosure is illustrated as including one power conditioner 31, one storage battery, one current sensor 33, one temperature sensor 35, one voltage sensor 36, and one storage battery management unit 37, any suitable number of such components may be included in the storage battery system 30.

The power conditioner 31 converts DC power discharged out of the storage battery into AC power, or converts AC power externally supplied to the storage battery into DC power.

For example, the storage battery is a battery capable of charge and discharge, such as a lithium-ion battery. The storage battery includes the electrochemical cell module 21 constructed of one or more electrochemical cells. The storage battery stores power in the electrochemical cell constituting the electrochemical cell module 21, or discharges power from the electrochemical cell. While, in FIG. 16, the electrochemical cell module 21 is illustrated as a module in which a plurality of electrochemical cells are connected in series, the plurality of electrochemical cells may be connected in parallel. Moreover, in the storage battery, a plurality of electrochemical cell modules 21 may be connected in series or in parallel.

The current sensor 33 measures the value of electric current passing through the storage battery. The value of electric current passing through the storage battery includes at least one of a current value inputted to the storage battery and a current value outputted from the storage battery. The current sensor 33 transmits the measured current value, as the value of electric current passing through the storage battery, to, for example, the storage battery management unit 37, etc. In this embodiment, the current sensor 33 is connected in series with one of the terminals of the electrochemical cell module 21. Note that the location to which the current sensor 33 is to be connected is not limited to one of the terminals of the electrochemical cell module 21 alone, and the current sensor 33 may therefore be connected to any given location that enables the current sensor 33 to measure the value of current passing through the storage battery.

The temperature sensor 35 measures the temperature of the storage battery. The temperature sensor 35 transmits the measured temperature, as the temperature of the storage battery, to, for example, the storage battery management unit 37, etc. In this embodiment, the temperature sensor 35 is disposed on the outer surface of one of the terminals of the electrochemical cell module 21. Note that the location where the temperature sensor 35 is to be disposed is not limited to the outer surface of one of the terminals of the electrochemical cell module 21 alone, and the temperature sensor 35 may therefore be disposed on any given location that enables the temperature sensor 35 to measure the temperature of the storage battery.

The voltage sensor 36 measures the value of voltage in the storage battery. The voltage sensor 36 transmits the measured voltage value, as the value of voltage in the storage battery, to, for example, the storage battery management unit 37, etc. For example, the value of voltage in the storage battery includes a voltage value in the storage battery in the process of charging or discharging, or an open voltage value in the storage battery in a current passage-free condition. In the embodiment of the storage battery system according to the disclosure, the voltage sensor 36 is connected in parallel with each terminal of the electrochemical cell module 21. Note that the location to which the voltage sensor 36 is to be connected is not limited to each terminal of the electrochemical cell module 21 alone, and the voltage sensor 36 may therefore be disposed on any given location that enables the voltage sensor 36 to measure the value of voltage in the storage battery.

The storage battery management unit 37 manages the storage battery. For example, the storage battery management unit 37 carries out ON-OFF control on the storage battery, or carries out control of transmission of information from the storage battery to the storage battery management unit 37.

Referring to FIG. 16, an embodiment of the storage battery management unit 37 according to the disclosure will be described. As shown in FIG. 16, the storage battery management unit 37 includes a control section 37a; a communications section 37b; a storage section 37c; an output section 37d; and an input section. The control section 37a, the communications section 37b, the storage section 37c, the output section 37d, and the input section are communicatively connected to each other by wired or wireless connection.

The control section 37a includes one or more processors. Examples of the processor include a general-purpose processor such as a CPU (Central Processing Unit) and a dedicated processor designed specifically for a specific processing operation. The component included in the control section 37a is not limited to the processor alone, and the control section 37a may therefore include one or more dedicated circuits. Examples of the dedicated circuit include an FPGA (Field-Programmable Gate Array) and an ASIC (Application Specific Integrated Circuit). The control section 37a controls the aforenamed communications section 37b, storage section 37c, output section 37d, and input section for the implementation of the features of the storage battery management unit 37.

The communications section 37b includes one or more communication modules. Examples of the communication module include a CAN communication module, a wired LAN (Local Area Network) communication module, and a wireless LAN communication module. In this embodiment, the storage battery management unit 37 can conduct communications with the power conditioner 31, the storage battery, the current sensor 33, the temperature sensor 35, the voltage sensor 36, etc. included in the storage battery system 30 via the communications section 37b.

For example, the storage section 37c is constructed of a semiconductor memory, a magnetic memory, or an optical memory. For example, the storage section 37c functions as a main memory or a secondary memory. The storage section 37c may be constructed of the cache memory of the processor included in the control section 37a. The storage section 37c may be constructed of volatile memory or non-volatile memory. The storage section 37c stores system programs, application programs, built-in software, and information for the implementation of the features of the storage battery management unit 37.

The output section 37d output information in the form of images, sounds, and like. For example, the output section 37d includes an output device such as a display and a speaker.

The input section accepts input operation. For example, the input section includes an input device such as a touch panel and a remote controller.

In the interests of clarity of explanation, in FIGS. 1 to 16, the individual electrochemical cells are illustrated as being identical in shape and arranged with their outer edges in registration, and so are the individual unit cells, the individual power generation elements, the individual inner containers, and the individual terminals. Note that, in the strict sense, the respective individual components do not necessarily have to be exactly identical in shape and arranged with their outer edges in full registration. For example, the first power generation element 103 and the second power generation element 113 may be considered to be identically shaped and stacked together with the respective outer edges in registration within a tolerance range of 5 mm or less. The same holds true for the electrochemical cells, the unit cells, the inner containers, and the terminals.

The invention claimed is:

1. An electrochemical cell, comprising:
a first cell comprising a first power generation element and a first inner container, the first inner container fully enclosing the first power generation element, and a surface of the first inner container being provided with a convexity that has (i) a curved surface and/or (ii) a flat surface;
a second cell comprising a second power generation element and a second inner container, the second inner container fully enclosing the second power generation element, and a surface of the second inner container being provided with a concavity that has a curved surface and/or a flat surface;
an outer container which fully encloses the first cell and the second cell; and
a fit portion in which the convexity is fitted in the concavity.

2. The electrochemical cell according to claim 1, wherein the first inner container has a first principal surface,
the second inner container has a second principal surface,
the first inner container and the second inner container are stacked so that the first principal surface and the second principal surface are opposed to each other, and
the convexity is located on the first principal surface, the concavity is located on the second principal surface, and in the fit portion, the convexity is fitted in the concavity.

3. The electrochemical cell according to claim 1, wherein the fit portion includes a plurality of fit portions.

4. The electrochemical cell according to claim 3, wherein the first power generation element is entirely located inside an outer periphery of the first inner container, and the first inner container has a first marginal edge disposed in non-overlapping relation to the first power generation element,
the second power generation element is entirely located inside an outer periphery of the second inner container, and the second inner container has a second marginal edge disposed in non-overlapping relation to the second power generation element, and
the convexity is located on the first marginal edge, the concavity is located on the second marginal edge, and in the fit portion, the convexity is fitted in the concavity.

5. The electrochemical cell according to claim 4, wherein the convexity is formed as a projection of the first inner container, and
the concavity is formed as a curved recess of the second inner container.

6. The electrochemical cell according to claim 5, wherein the fit portions are located in a region surrounded by lines extending from the long sides of the first power generation element, lines extending from the short sides of the first power generation element, and the outer periphery of the first inner container.

7. The electrochemical cell according to claim 4, wherein the first power generation element and the second power generation element each have a rectangular shape having long sides and short sides, as viewed in a stacking direction of the first power generation element and the second power generation element, and
the fit portions are located along respective long sides of the first power generation element and the second power generation element, or located along respective lines extending from the respective long sides of the first power generation element and the second power generation element.

8. The electrochemical cell according to claim 4, wherein the first power generation element and the second power generation element each have a rectangular shape having long sides and short sides, as viewed in a stacking direction of the first power generation element and the second power generation element,
the fit portions each have a rectangular shape having long sides and short sides, as viewed in the stacking direction, and
the short sides of the fit portions extend along respective long sides of the first power generation element and the second power generation element, or extend along respective lines extending from the respective long sides of the first power generation element and the second power generation element.

9. The electrochemical cell according to claim 3, wherein
the first inner container has a second concavity contiguous to the convexity,
the second inner container has a second convexity contiguous to the concavity, and
the electrochemical cell further comprises a second fit portion in which the second convexity is fitted in the second concavity.

10. The electrochemical cell according to claim 1, wherein
the convexity comprises a third convexity and a fourth convexity located on a surface of the third convexity,
the concavity comprises a third concavity and a fourth concavity located on a surface of the third concavity, and
the electrochemical cell further comprises a third fit portion in which the third convexity is fitted in the third concavity and the fourth convexity is fitted in the fourth concavity.

11. The electrochemical cell according to claim 1, wherein
each of the first inner container and the second inner container is a bag.

12. The electrochemical cell according to claim 1, wherein
the fit portion overlaps the first and second power generation elements in a stacking direction of the first power generation element and the second power generation element.

13. The electrochemical cell according to claim 1, wherein
the fit portion is located in a flange formed of the outer container, the first inner container, and the second inner container.

14. An electrochemical cell module, comprising:
a housing;
a first electrochemical cell located inside the housing;
a second electrochemical cell located inside the housing; and
a connection portion that electrically connects the first electrochemical cell and the second electrochemical cell,
wherein each of the first electrochemical cell and the second electrochemical cell includes:
a first cell comprising a first power generation element and a first inner container, the first inner container fully enclosing the first power generation element, and a surface of the first inner container being provided with a convexity that has (i) a curved surface and/or (ii) a flat surface;
a second cell comprising a second power generation element and a second inner container, the second inner container fully enclosing the second power generation element, and a surface of the second inner container being provided with a concavity that has a curved surface and/or a flat surface;
an outer container which fully encloses the first cell and the second cell; and
a fit portion in which the convexity is fitted in the concavity.

15. A storage battery system, comprising:
an electrochemical cell module; and
a control section configured to control the electrochemical cell module,
wherein
the electrochemical cell module includes:
a housing;
a first electrochemical cell located inside the housing;
a second electrochemical cell located inside the housing; and
a connection portion that electrically connects the first electrochemical cell and the second electrochemical cell, and
each of the first electrochemical cell and the second electrochemical cell includes:
a first cell comprising a first power generation element and a first inner container, the first inner container fully enclosing the first power generation element, and a surface of the first inner container being provided with a convexity that has (i) a curved surface and/or (ii) a flat surface;
a second cell comprising a second power generation element and a second inner container, the second inner container fully enclosing the second power generation element, and a surface of the second inner container being provided with a concavity that has a curved surface and/or a flat surface;
an outer container which fully encloses the first cell and the second cell; and
a fit portion in which the convexity is fitted in the concavity.

* * * * *